(12) United States Patent
Tischler et al.

(10) Patent No.: US 8,760,075 B1
(45) Date of Patent: Jun. 24, 2014

(54) ILLUMINATION DEVICE CONTROL SYSTEMS AND METHODS

(71) Applicants: Michael A. Tischler, Vancouver (CA); William P. Coetzee, Coquitlam (CA); Paul Jungwirth, Burnaby (CA)

(72) Inventors: Michael A. Tischler, Vancouver (CA); William P. Coetzee, Coquitlam (CA); Paul Jungwirth, Burnaby (CA)

(73) Assignee: Cooledge Lighting Inc., Burnaby (CA)

( * ) Notice: Subject to any disclaimer, the term of this patent is extended or adjusted under 35 U.S.C. 154(b) by 0 days.

(21) Appl. No.: 13/965,392

(22) Filed: Aug. 13, 2013

Related U.S. Application Data

(60) Provisional application No. 61/813,027, filed on Apr. 17, 2013.

(51) Int. Cl.
  *H05B 41/36* (2006.01)

(52) U.S. Cl.
  USPC ........ 315/291; 315/307; 315/247; 315/185 S; 315/312

(58) Field of Classification Search
  CPC ........................................... H05B 41/36
  USPC ...................... 315/274–280, 291, 247, 185 S, 315/307–326, 224, 225, 246
  See application file for complete search history.

(56) References Cited

U.S. PATENT DOCUMENTS

| | | | |
|---|---|---|---|
| 8,339,048 B2 * | 12/2012 | Newman et al. | 315/178 |
| 2010/0060200 A1 * | 3/2010 | Newman et al. | 315/307 |

* cited by examiner

*Primary Examiner* — Tuyet Thi Vo
(74) *Attorney, Agent, or Firm* — Bingham McCutchen LLP

(57) ABSTRACT

In various embodiments, a control system for an electronic circuit iteratively applies voltage to and senses current from a load to regulate operation of the load.

16 Claims, 11 Drawing Sheets

ILLUMINATION DEVICE CONTROL SYSTEMS AND METHODS

RELATED APPLICATION

This application claims the benefit of and priority to U.S. Provisional Patent Application No. 61/813,027, filed Apr. 17, 2013, the entire disclosure of which is incorporated herein by reference.

TECHNICAL FIELD

In various embodiments, the present invention relates generally to light-emitting systems and methods, and more specifically to such systems and methods that provide control over various lighting parameters in systems featuring strings of light-emitting elements.

BACKGROUND

Solid-state lighting is an attractive alternative to incandescent and fluorescent lighting systems because of its relatively higher efficiency, robustness and long life. However, many solid-state lighting systems utilize light-emitting diodes (LEDs) that require different drive circuitry than incandescent and fluorescent light emitters. LEDs are typically operated in current-control mode, in which the current through the LED is controllably set to particular values to achieve desired optical characteristics, such as brightness levels.

Manufacturing variations in electronic components may result in a distribution of electrical and optical parameters. For example, in the case of LEDs, there is generally a distribution in parameters such as forward voltage, light output power and wavelength. For LED-based lighting systems, particularly where such systems include arrays of LEDs, such variations result in the need for a system that can accommodate possible variations not only in the manufacturing distribution, but also that may arise from other sources, such as ambient or operational temperature variations, aging, or the like. This applies not only to light-emitting elements (LEEs), such as LEDs, but to all other active and passive components that may be in the system, e.g., to control the current to the LEDs or to power the entire system.

For example, consider the system shown in FIG. 1, which features one or more strings 160 of series-connected LEEs 110 and a current-control element (CCE) 120. The combination of the LEEs and the CCEs may be called a light-emitting array. A light-emitting array may include or consist essentially of one or more than one light-emitting string 160. The string voltage is the voltage of the sum of the forward voltages of the individual LEEs at the desired operating current added to the voltage dropped across CCE 120. In one example, for GaN-based blue LEDs, the forward voltage, for a fixed current, may be in the range of about 2.6 V to about 3.1 V, depending on variations in the LED fabrication process. Thus, depending on the distribution of forward voltage characteristics, the voltage across the 10 LEDs in FIG. 1 may range from about 26 V to about 31 V. For a light-emitting array with multiple strings in parallel, as shown in FIG. 1, a string with a relatively low string voltage will generally result in a relatively higher voltage dropped over CCE 120, whereas a string with a relatively higher string voltage will generally have a relatively lower voltage dropped over CCE 120. In the design of such systems the voltage of power supply 130 must be large enough to accommodate the highest possible string voltage within the manufacturing and operational distribution of the light-emitting array as well as the voltage supply.

Consider a relatively common case where the forward voltage of each LEE is nominally about 2.9 V and the nominal voltage drop across CCE 120 is about 2 V. For a string of 10 LEEs, the string voltage is then about 31 V. This sets the nominal value of voltage to be supplied to the light-emitting array at about 31 V.

Now consider the scenario where the string voltage is on the high end of the range, for example where the LEE forward voltage is about 3.1 V and the voltage drop across the 10 LEEs is about 31 V. In some embodiments, CCE 120 may require at least about 2 V to operate, so the light-emitting array requires a supplied voltage of 33 V, 2 V higher than the nominal amount. Next, consider the scenario where the string voltage is on the low end of the range, for example where the LEE forward voltage is about 2.7 V. The voltage drop across the 10 LEEs is then about 27 V.

In this situation, the voltage supply needs to be about 33 V to accommodate the high end of the LEE forward voltage distribution. However, in the nominal case, the voltage dropped across CCE 120 is 4 V and in the minimum forward voltage case it is 6 V. Thus, the power dissipated in CCE 120 in the nominal case is twice that of the maximum forward voltage case, and the power dissipated in CCE 120 in the minimum forward voltage case is three times that of the maximum forward voltage case. Even without accounting for other variations, such as in the voltage supply, CCE 120, or operational variations, it is clear that such a design may be optimized for efficiency in a narrow set of parameter ranges, but as a result of manufacturing and operational variations, may operate at significantly lower efficiencies. Further, the additional power dissipated in CE 120 results in additional heat, which may be difficult to remove and may also lead to thermal degradation and a reduction in lifetime and/or reliability.

One approach to mitigating this problem is reduce the manufacturing and/or operational variations that might be encountered, for example by sorting and binning LEEs, using higher precision components in the voltage supply and CCE, controlling the ambient temperature range, or the like. However, these approaches are undesirable because they are time consuming and expensive.

Accordingly there is a need for solutions that provide improved drive capability for LEE systems, in particular providing improved control of current through the LEEs as well as high efficiency.

SUMMARY

In accordance with certain embodiments, the signature of the relationship between load current and applied voltage is dynamically evaluated and used to set a desired voltage level that matches the load to achieve a desired operational result, e.g., optimizing a given system for efficiency. Different voltages are applied to the load and the difference in resulting currents is utilized to adjust the subsequent applied voltage. This iterative procedure is generally performed during the entire operation of the load, rather than merely during a "start-up" period soon after power is initially applied. In this manner, variations in the electrical characteristics of the load due to aging and/or environmental (e.g., temperature) changes are addressed via changes in the applied voltage, thereby regulating operation of the load and optimizing its efficiency. Furthermore, the control system may be utilized with any of a variety of different loads having different electrical characteristics (e.g., current-voltage characteristics) while automatically optimizing efficiency thereof.

Additional details of lighting systems in accordance with embodiments of the present invention appear within U.S. patent application Ser. No. 13/799,807, filed Mar. 13, 2013 (the '807 application), and U.S. patent application Ser. No. 13/748,864, filed Jan. 24, 2013 (the '864 application), the entire disclosure of each of which is incorporated by reference herein.

As utilized herein, the term "light-emitting element" (LEE) refers to any device that emits electromagnetic radiation within a wavelength regime of interest, for example, visible, infrared or ultraviolet regime, when activated, by applying a potential difference across the device or passing a current through the device. Examples of LEEs include solid-state, organic, polymer, phosphor-coated or high-flux LEDs, microLEDs (described below), laser diodes or other similar devices as would be readily understood. The emitted radiation of a LEE may be visible, such as red, blue or green, or invisible, such as infrared or ultraviolet. A LEE may produce radiation of a spread of wavelengths. A LEE may feature a phosphorescent or fluorescent material for converting a portion of its emissions from one set of wavelengths to another. A LEE may include multiple LEEs, each emitting essentially the same or different wavelengths. In some embodiments, a LEE is an LED that may feature a reflector over all or a portion of its surface upon which electrical contacts are positioned. The reflector may also be formed over all or a portion of the contacts themselves. In some embodiments, the contacts are themselves reflective.

An LEE may be of any size. In some embodiments, an LEE has one lateral dimension less than 500 µm, while in other embodiments an LEE has one lateral dimension greater than 500 µm. Exemplary sizes of a relatively small LEE may include about 175 µm by about 250 µm, about 250 µm by about 400 µm, about 250 µm by about 300 µm, or about 225 µm by about 175 µm. Exemplary sizes of a relatively large LEE may include about 1000 µm by about 1000 µm, about 500 µm by about 500 µm, about 250 µm by about 600 µm, or about 1500 µm by about 1500 µm. In some embodiments, an LEE includes or consists essentially of a small LED die, also referred to as a "microLED." A microLED generally has one lateral dimension less than about 300 µm. In some embodiments, the LEE has one lateral dimension less than about 200 µm or even less than about 100 µm. For example, a microLED may have a size of about 225 µm by about 175 µm or about 150 µm by about 100 µm or about 150 µm by about 50 µm. In some embodiments, the surface area of the top surface of a microLED is less than 50,000 µm$^2$ or less than 10,000 µm$^2$. The size of the LEE is not a limitation of the present invention, and in other embodiments the LEE may be relatively larger, e.g., the LEE may have one lateral dimension on the order of at least about 1000 µm or at least about 3000 µm. In some embodiments the LEE may emit white light or substantially white light.

In some embodiments, various elements such as substrates or lightsheets are "flexible" in the sense of being pliant in response to a force and resilient, i.e., tending to elastically resume an original configuration upon removal of the force. Such elements may have a radius of curvature of about 1 m or less, or about 0.5 m or less, or even about 0.1 m or less. In some embodiments, flexible elements have a Young's Modulus less than about 100 N/m$^2$, less than about 50 N/m$^2$, or even less than about 10 N/m$^2$. In some embodiments, flexible elements have a Shore A hardness value less than about 100; a Shore D hardness less than about 100; and/or a Rockwell hardness less than about 150.

In an aspect, embodiments of the invention feature a method for controlling a circuit via application of first and second voltages. The circuit incorporates a load having electrical characteristics, which may include or consist essentially of a non-linear current-voltage relationship. In a step (A), the first voltage is applied to the load. In a step (B), a first current resulting from the first voltage applied to the load is measured. In a step (C), the second voltage is applied to the load. In a step (D), a second current resulting from the second voltage applied to the load is measured. A current difference between the second current and the first current has a magnitude and a polarity. In a step (E), the first voltage is set equal to the second voltage. In a step (F), the second voltage is altered by a voltage increment (which may be positive or negative) based on the magnitude and the polarity of the current difference. In a step (G), steps (A)-(F) are repeated during operation of the circuit to regulate operation of the load notwithstanding any changes in the electrical characteristics (e.g., the non-linear current-voltage relationship) of the load during operation.

In another aspect, embodiments of the invention feature a method for controlling a circuit via application of first and second voltages. The circuit incorporates a load having electrical characteristics, which may include or consist essentially of a non-linear current-voltage relationship. In a step (A), the first voltage is applied to the load. In a step (B), a first current resulting from the first voltage applied to the load is measured. In a step (C), the second voltage is applied to the load. In a step (D), a second current resulting from the second voltage applied to the load is measured. A current difference between the second current and the first current has a magnitude and a polarity. In a step (E), if the magnitude of the current difference is greater than a pre-determined value and the polarity of the current difference is positive, the first voltage is set equal to the second voltage and the second voltage is increased by a voltage increment. In a step (F), if the magnitude of the current difference is smaller than the pre-determined value and the polarity of the current difference is negative, the first voltage is set equal to the second voltage and the second voltage is decreased by the voltage increment. In a step (G), if the magnitude of the current difference is greater than the pre-determined value and the polarity of the current difference is negative, the first voltage is set equal to the second voltage and the second voltage is increased by the voltage increment. In a step (H), if the magnitude of the current difference is smaller than the pre-determined value and the polarity of the current difference is negative, the first voltage is set equal to the second voltage and the second voltage is decreased by the voltage increment. In a step (I), steps (A)-(H) are repeated during operation of the circuit to regulate operation of the load notwithstanding any changes in the electrical characteristics (e.g., the non-linear current-voltage relationship) of the load during operation.

Embodiments of the invention may include one or more of the following in any of a variety of combinations. The magnitude of the current difference may be greater than the pre-determined value, the second voltage may be increased above a maximum operating voltage, and the second voltage may be decreased to the maximum operating voltage or less prior to applying the second voltage to the load. The maximum operating voltage may be approximately 60 V. The method may include pausing for a pre-determined amount of time prior to applying the second voltage to the load. The pre-determined amount of time may be selected from the range of approximately 10 milliseconds to approximately 3600 seconds. The pre-determined amount of time may increase as a number of times steps (A)-(H) are repeated increases. The voltage increment may decrease as a number of times steps (A)-(H) are repeated increases.

After a plurality of repetitions of steps (A)-(H), the circuit may operate at a stable operating range for at least a second plurality of repetitions of steps (A)-(H). As used herein, a "stable operating range" is a substantially unchanging range of voltages bounded by the first and second voltages; that is, the voltage applied to the load oscillates between substantially constant first and second voltages, thereby defining the stable operating range. The stable operating range is generally constant while the current-voltage relationship of the load is substantially constant; changes in the current-voltage relationship of the load may alter the stable operating range.

The method may include pausing for a pre-determined amount of time prior to applying the second voltage to the load, and the pre-determined amount of time may increase at least once while the circuit operates at the stable operating range. The pre-determined amount of time may be reset to a default value if circuit operation diverges from the stable operating range. The voltage increment may be decreased at least once while the circuit operates at the stable operating range. After the voltage increment has been decreased, the voltage increment may be maintained at a substantially constant value notwithstanding continued circuit operation at the stable operating range. The voltage increment may be reset to a default value if the circuit operation diverges from the stable operating range.

The load may include or consist essentially of a light-emitting array. The light-emitting array may include or consist essentially of first and second spaced-apart power conductors, a plurality of light-emitting strings, and a plurality of control elements. Each light-emitting string may include or consist essentially of a plurality of interconnected light-emitting diodes spaced along the light-emitting string. A first end of each light-emitting string may be electrically coupled to the first power conductor, and a second end of each light-emitting string may be electrically coupled to the second power conductor. The power conductors may supply power to each of the light-emitting strings. Each control element may be electrically connected to at least one light-emitting string and configured to utilize power supplied from the power conductors to control the current to the at least one light-emitting string to which it is electrically connected. The light-emitting diodes may emit substantially white light. The non-linear current-voltage relationship of the load may include a knee (i.e., a change in slope), a stationary point (i.e., a local or absolute maximum or minimum), and/or an inflection point.

In yet another aspect, embodiments of the invention feature a control system for operating a load via application of first and second voltages. The load may have electrical characteristics that may include or consist essentially of a non-linear current-voltage relationship. The control system includes or consists essentially of a variable voltage source, a sense element, and a controller. The controller is configured to, in a step (A), apply, via the variable voltage source, the first voltage to the load, in a step (B), measure, via the sense element, a first current resulting from the first voltage applied to the load, in a step (C), apply, via the variable voltage source, the second voltage to the load, and in a step (D), measure, via the sense element a second current resulting from the second voltage applied to the load. A current difference between the second current and the first current has a magnitude and a polarity. The controller is further configured to, in a step (E), if the magnitude of the current difference is greater than a pre-determined value and the polarity of the current difference is positive, (i) set the first voltage equal to the second voltage and (ii) increase the second voltage by a voltage increment. The controller is further configured to, in a step (F), if the magnitude of the current difference is smaller than the pre-determined value and the polarity of the current difference is negative, (i) set the first voltage equal to the second voltage and (ii) decrease the second voltage by the voltage increment. The controller is further configured to, in a step (G), if the magnitude of the current difference is greater than the pre-determined value and the polarity of the current difference is negative, (i) set the first voltage equal to the second voltage and (ii) increase the second voltage by the voltage increment. The controller is further configured to, in a step (H), if the magnitude of the current difference is smaller than the pre-determined value and the polarity of the current difference is negative, (i) set the first voltage equal to the second voltage and (ii) decrease the second voltage by the voltage increment. The controller is further configured to, in a step (I), repeat steps (A)-(H) during operation of the circuit to regulate operation of the load notwithstanding any changes in the electrical characteristics (e.g., the non-linear current-voltage relationship) of the load during operation.

Embodiments of the invention may include one or more of the following in any of a variety of combinations. The load may have a non-linear current-voltage relationship. The load may include or consist essentially of a plurality of light-emitting elements. The load may include or consist essentially of a plurality of light-emitting strings each including or consisting essentially of a plurality of series-connected light-emitting elements and at least one current-control element. The at least one current-control element may include or consist essentially of two transistors and two resistors. The sense element may include or consist essentially of a resistor.

The load may include or consist essentially of a light-emitting array. The light-emitting array may include or consist essentially of first and second spaced-apart power conductors, a plurality of light-emitting strings, and a plurality of control elements. Each light-emitting string may include or consist essentially of a plurality of interconnected light-emitting diodes spaced along the light-emitting string. A first end of each light-emitting string may be electrically coupled to the first power conductor, and a second end of each light-emitting string may be electrically coupled to the second power conductor. The power conductors may supply power to each of the light-emitting strings. Each control element may be electrically connected to at least one light-emitting string and configured to utilize power supplied from the power conductors to control the current to the at least one light-emitting string to which it is electrically connected. The light-emitting diodes may emit substantially white light. The non-linear current-voltage relationship of the load may include a knee, a stationary point, and/or an inflection point.

In another aspect, embodiments of the invention feature a control system for operating a load via application of first and second voltages. The load may have electrical characteristics that may include or consist essentially of a non-linear current-voltage relationship. The control system includes or consists essentially of a variable voltage source, a sense element, and a controller. The controller is configured to, in a step (A), apply, via the variable voltage source, the first voltage to the load, in a step (B), measure, via the sense element, a first current resulting from the first voltage applied to the load, in a step (C), apply, via the variable voltage source, the second voltage to the load, and in a step (D), measure, via the sense element a second current resulting from the second voltage applied to the load. A current difference between the second current and the first current has a magnitude and a polarity. The controller is further configured to, in a step (E), set the first voltage equal to the second voltage, and in a step (F), alter (i.e., add to or subtract from) the second voltage by a voltage increment based on the magnitude and the polarity of the current difference. The controller is further configured to, in a step (G), repeat steps (A)-(F) during operation of the circuit to regulate operation of the load notwithstanding any changes in the electrical characteristics (e.g., the non-linear current-voltage relationship) of the load during operation.

Embodiments of the invention may include one or more of the following in any of a variety of combinations. The controller may be configured to alter the second voltage by one or more of the following. If the magnitude of the current difference is greater than a pre-determined value and the polarity of the current difference is positive, the second voltage is increased by the voltage increment. If the magnitude of the current difference is smaller than the pre-determined value and the polarity of the current difference is negative, the second voltage is decreased by the voltage increment. If the magnitude of the current difference is greater than the pre-determined value and the polarity of the current difference is negative, the second voltage is increased by the voltage increment. If the magnitude of the current difference is smaller than the pre-determined value and the polarity of the current difference is negative, the second voltage is decreased by the voltage increment.

The load may include or consist essentially of a plurality of light-emitting elements. The load may include or consist essentially of a plurality of light-emitting strings each including or consisting essentially of a plurality of series-connected light-emitting elements and at least one current-control element. The at least one current-control element may include or consist essentially of two transistors and two resistors. The sense element may include or consist essentially of a resistor. The non-linear current-voltage relationship of the load may include a knee, a stationary point, and/or an inflection point.

The load may include or consist essentially of a light-emitting array. The light-emitting array may include or consist essentially of first and second spaced-apart power conductors, a plurality of light-emitting strings, and a plurality of control elements. Each light-emitting string may include or consist essentially of a plurality of interconnected light-emitting diodes spaced along the light-emitting string. A first end of each light-emitting string may be electrically coupled to the first power conductor, and a second end of each light-emitting string may be electrically coupled to the second power conductor. The power conductors may supply power to each of the light-emitting strings. Each control element may be electrically connected to at least one light-emitting string and configured to utilize power supplied from the power conductors to control the current to the at least one light-emitting string to which it is electrically connected. The light-emitting diodes may emit substantially white light.

These and other objects, along with advantages and features of the invention, will become more apparent through reference to the following description, the accompanying drawings, and the claims. Furthermore, it is to be understood that the features of the various embodiments described herein are not mutually exclusive and can exist in various combinations and permutations. Reference throughout this specification to "one example," "an example," "one embodiment," or "an embodiment" means that a particular feature, structure, or characteristic described in connection with the example is included in at least one example of the present technology. Thus, the occurrences of the phrases "in one example," "in an example," "one embodiment," or "an embodiment" in various places throughout this specification are not necessarily all referring to the same example. Furthermore, the particular features, structures, routines, steps, or characteristics may be combined in any suitable manner in one or more examples of the technology. As used herein, the terms "substantially," "approximately," and "about" mean±10%, and in some embodiments, ±5%. The term "consists essentially of" means excluding other materials that contribute to function, unless otherwise defined herein. Nonetheless, such other materials may be present, collectively or individually, in trace amounts.

BRIEF DESCRIPTION OF THE DRAWINGS

In the drawings, like reference characters generally refer to the same parts throughout the different views. Also, the drawings are not necessarily to scale, with an emphasis instead generally being placed upon illustrating the principles of the invention. In the following description, various embodiments of the present invention are described with reference to the following drawings, in which.

DETAILED DESCRIPTION

Figure 1:
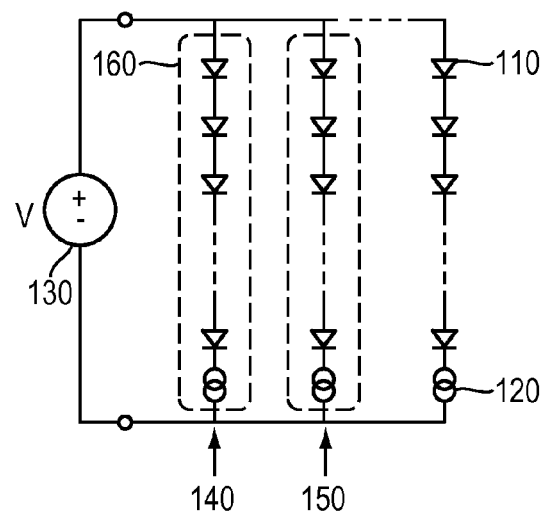
FIG. 1 is a circuit diagram of an illumination system.
Figure 2A:
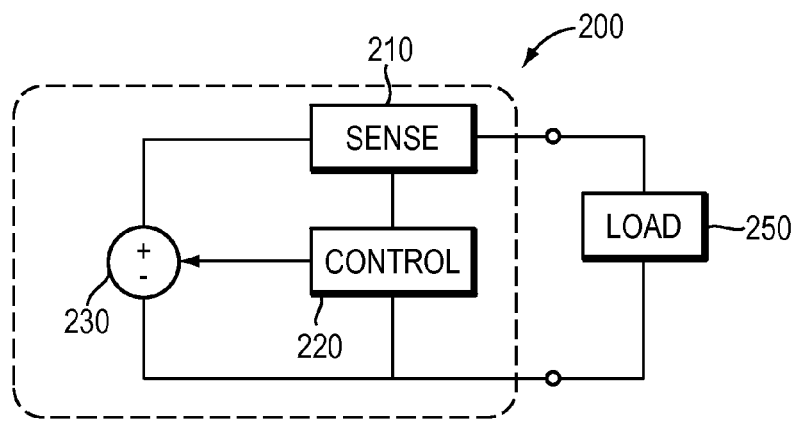
FIG. 2A is a block diagram of a system in accordance with various embodiments of the invention.

FIG. 2A depicts an exemplary adaptive power system 200 in accordance with embodiments of the present invention, although alternative systems with similar functionality are also within the scope of the invention. As depicted, adaptive power system 200 includes or consists essentially of a variable voltage source 230, a sense element 210 and a controller 220. Adaptive power system 200 is connected to a load 250 (e.g., one or more LEEs or light-emitting strings). The controller 220, which embodies principles of the present invention, directs variable voltage source 230 to supply a specific voltage in response to a process embedded within controller 220 and the value of the current sensed by sense element 210, as will be discussed herein.

Figure 2B:
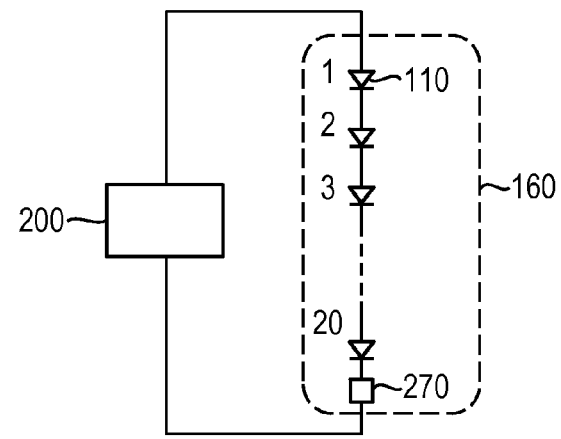
FIGS. 2B and 2C are partial circuit diagrams of illumination systems in accordance with various embodiments of the invention.

In one embodiment of the present invention, adaptive power system 200 powers one or more light-emitting strings electrically coupled in parallel, where each light-emitting string includes or consists essentially of one or more LEEs 110 electrically coupled in series with each other and with a CCE 270, as shown in FIG. 2B. Referring to the structure of FIG. 2B, a string 160 is equivalent to load 250 in FIG. 2A. The system shown in FIG. 2B includes or consists essentially of 20 LEEs 110 in string 160; however, this is not a limitation of the present invention, and in other embodiments the number of LEEs 110 per string 160 may be more or fewer than 20. Moreover, although the system shown in FIG. 2B includes one string 160, this also is not a limitation of the present invention, and in other embodiments more than one string 160 may be utilized, for example in a parallel electrical configuration.

Figure 2C:
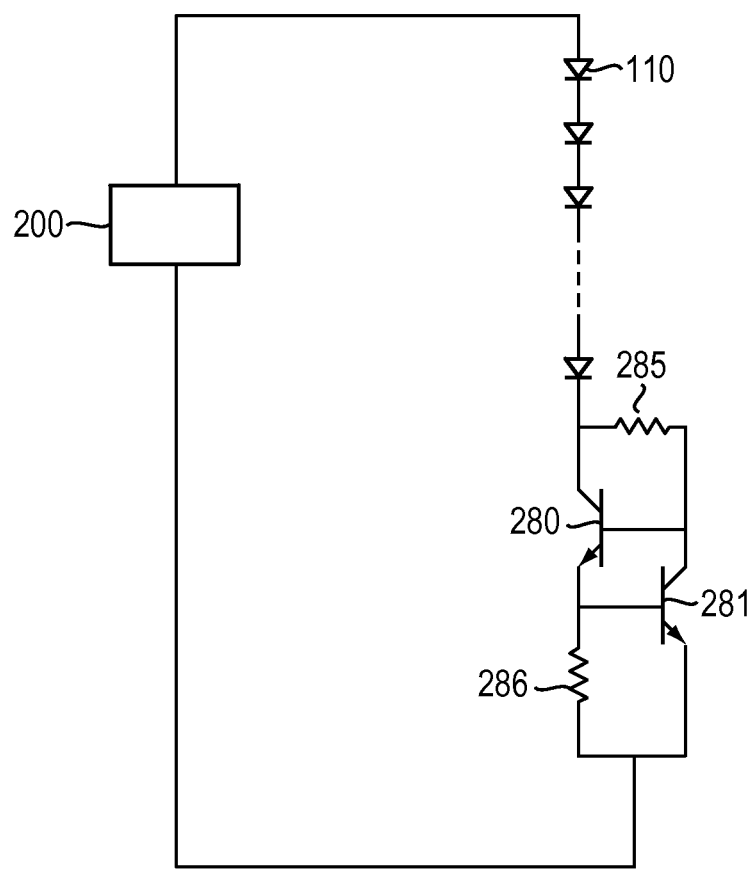

FIG. 2C shows a system similar to that of FIG. 2B, and illustrates one embodiment of CCE 270. In the depicted embodiment, CCE 270 includes or consists essentially of two resistors 285, 286 and two transistors 280, 281 interconnected as shown in FIG. 2B. In general, CCEs may include one or more passive components, such as resistors, capacitors, inductors, or fuses, as well as active components, e.g., transistors and diodes.

Figure 3A:
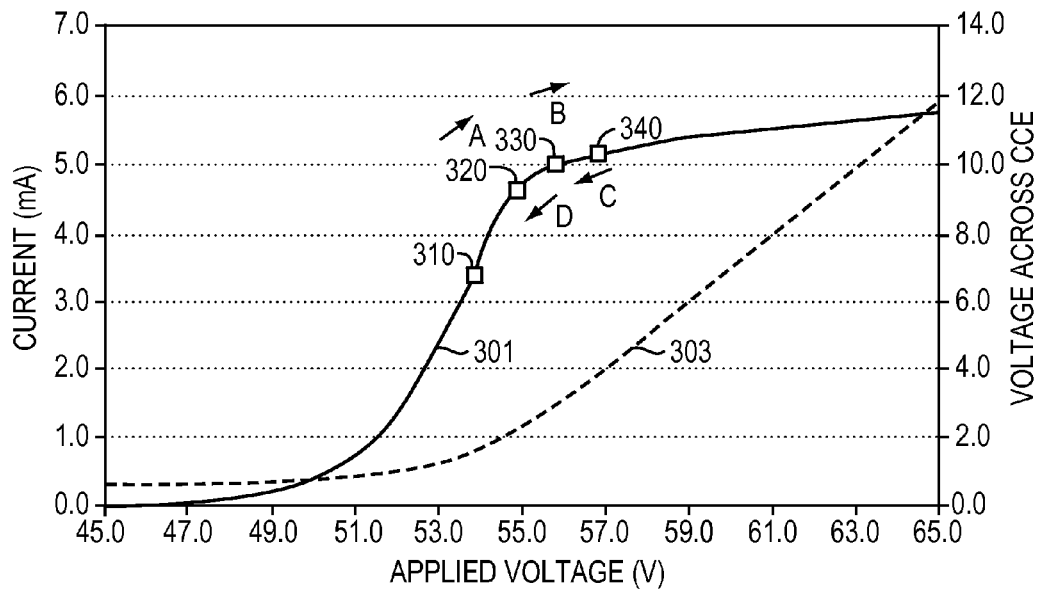
FIGS. 3A-3H are graphs of current-voltage relationships of loads in accordance with various embodiments of the invention.

FIG. 3A shows a simulation of a string current 301 and a voltage 303 across CCE 270 as a function of applied voltage for the system of FIG. 2C. In this example the system includes 20 GaN-based LEEs 110 having a forward voltage in the range of about 2.6 V to about 3.1 V at a current of about 5 mA. In this example the circuit is designed to control the string current to about 5 mA; resistor 285 has a value of about 39 kohms, resistor 286 has a value of about 113 ohms, and transistors 280 and 281 may each be a MMBT2484 NPN general purpose amplifier manufactured by Fairchild Semiconductor. If LEEs 110 have a nominal forward voltage of about 2.7 V, then the total voltage drop across all 20 LEEs 110 is about 54 V. In order for the circuit to operate, the applied voltage is at least about this value plus the voltage drop across CCE 270. (As utilized herein, the "design point" is a product-wide, rather than individual device-specific, designated operating current (or operating voltage designed to achieve the designated current); actual individual devices may vary from the design point in operation. As utilized herein, the "relatively optimal operating point" is the actual voltage required to achieve the desired operating current for a specific device at a specific time. During device operation the relatively optimal operating point may vary temporarily (e.g., due to temperature variations) or permanently (e.g., due to aging).)

As may be seen from FIG. 3A, the circuit starts to turn on at about 52 V, at which point the string current is about 2 mA. Increasing the applied voltage above this level produces a relatively rapid increase in current and then, at the design point of 5 mA, the value of applied voltage levels off at about 55.8 V. At this point the applied voltage is about 55.8 V, the voltage across CCE 270 is about 1.8 V, the voltage across the 20 LEEs 110 is about 54 V, and the current through the LEEs 110 is about 5 mA. As shown, operation of the circuit at applied voltages a small amount lower than or higher than the design point results in only small changes in the LEE 110 current. However, while the current is relatively well controlled, the efficiency may decrease at higher applied voltages because the voltage drop across CCE 270 accounts for a relatively larger portion of the overall voltage drop, which results in relatively more power dissipated as heat in this component. Thus, the efficiency decreases as the applied voltage is raised above the design point and, in preferred embodiments, the relatively optimal operating point is the minimum applied voltage that just achieves the desired current flow for a given device. One aspect of embodiments of the present invention is a system that automatically maintains the relatively optimal operating point. Specifically, the system may maintain the relatively optimal operating point via oscillating application of operating voltages that (1) are substantially constant over time (in the absence of temporary or permanent variations of the I-V characteristics of the devices of the load) and (2) bound the relatively optimal operating point within a stable operating range of voltages.

The operation of one embodiment of the invention may be understood in reference to FIG. 3A, which shows the load current 301 (current through LEEs 110) and the voltage drop 303 across CCE 270 as a function of applied voltage.

Figure 3B:
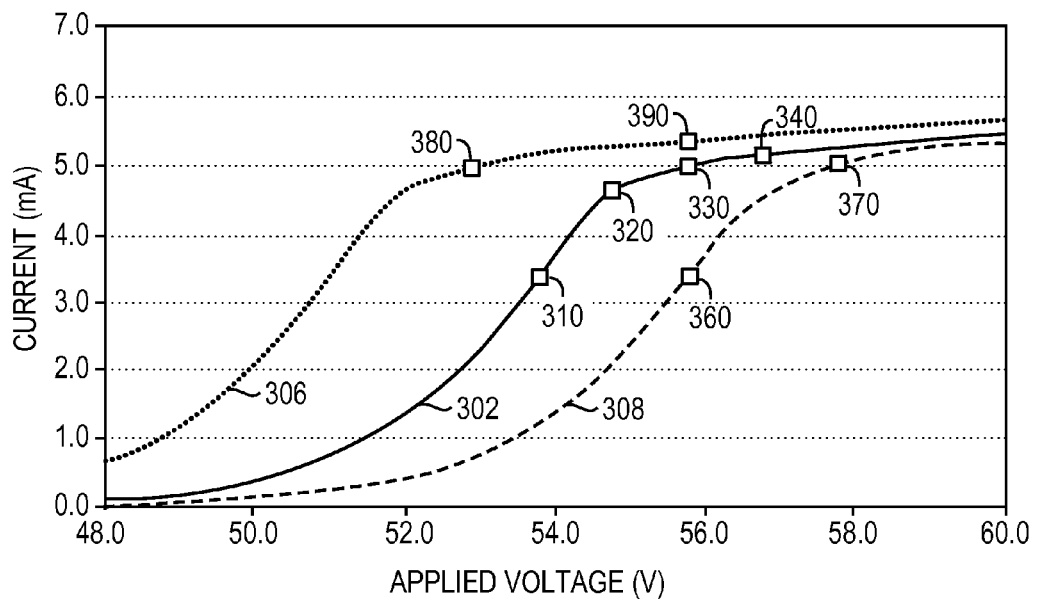

With reference to FIGS. 2B, 3A, and 3B, in one embodiment, operation of the system of FIG. 2B begins at the voltage at point 310, designated as $V_{310}$. The current at this point is measured and designated as $I_{310}$. The voltage is then incremented to the voltage indicated by point 320, giving a voltage $V_{320}$ and a current $I_{320}$. The magnitude and sign of the difference between $I_{320}$ and $I_{310}$ is then measured. If the magnitude of the difference is larger than a pre-determined value DI, and the sign of $I_{320}$-$I_{310}$ is positive, then the system increments the voltage once again to point 330, producing voltage $V_{330}$ and current $I_{330}$. The magnitude and sign of the difference between $I_{330}$ and $I_{320}$ is again measured. If the magnitude of the difference is larger than a pre-determined value, and the sign of $I_{330}$-$I_{320}$ is positive, then the system increments the voltage once again to point 340, producing voltage $V_{340}$ and current $I_{340}$. The magnitude and sign of the difference between $I_{340}$ and $I_{330}$ is again measured. In this case the difference between $I_{340}$ and $I_{330}$ is less than a pre-determined value, but the sign is still positive, so the system does not increment the voltage further. Instead, the system decrements the voltage, for example back to $V_{330}$ at the point 330. In a stable system, the decrement back to $V_{330}$ will typically result in a current of $I_{330}$. The magnitude and sign of the difference between $I_{340}$ and $I_{330}$ is measured. In this example the difference between $I_{340}$ and $I_{330}$ is less than the preset value, but the sign is negative, so the system decrements the voltage once more to point 320, where, typically in a stable system the voltage is $V_{320}$ and the current is $I_{320}$. Now the difference between $I_{320}$ and $I_{330}$ is determined and, again in a stable system, found to be larger than the pre-determined value. Also the sign is negative, so the system knows that it has gone too far and increments the applied voltage, for example back to $V_{330}$ where the current is $I_{330}$.

A table of rules for various embodiments of the present invention is shown in Table 1. Table 1 shows the direction of the voltage change (increment or decrement) as a function of the magnitude and sign of the difference between the two measured currents. As may be understood by this description, the voltage then steps back and forth around the design point 330, e.g., up to 340 and down to 320. FIG. 3A may be utilized to illustrate an exemplary embodiment of the present invention in which the system maintains the relatively optimal operating point via oscillating application of operating voltages that (1) are substantially constant over time (in the absence of temporary or permanent variations of the I-V characteristics of the devices of the load) and (2) bound the relatively optimal operating point within a stable operating range of voltages. The operation may be described from any starting point; here, starting with operating point 320, the system has just decremented itself from operating point 330. This operation is identified as Phase A in the phase cycle detailed below.

Phase A.

At this point the operating point has just changed from point 330 to point 320 (i.e., the voltage has just decremented from $V_{330}$ to $V_{320}$). $I_{320}$-$I_{330}$ is evaluated and the determination is made that the sign (i.e., the polarity) is negative and the magnitude is greater than the predetermined value. As Table 1 indicates, rule 4 is then applied to increment the voltage to operating point 330.

Phase B.

At this point the operating point has just changed from point 320 to point 330. $I_{330}$-$I_{320}$ is evaluated and the determination is made that the sign is positive and the magnitude is greater than the predetermined value. As Table 1 indicates, rule 1 is then applied to increment the voltage to operating point 340.

Phase C.

At this point the operating point has just changed from point 330 to point 340. $I_{340}$-$I_{330}$ is evaluated and the determination is made that the sign is positive and the magnitude is less than the predetermined value. As Table 1 indicates, rule 2 is then applied to decrement the voltage to operating point 330.

Phase D.

At this point the operating point has just changed from point 340 to point 330. $I_{330}$-$I_{340}$ is evaluated and the determination is made that the sign is negative and the magnitude is less than the predetermined value. As Table 1 indicates, rule 3 is then applied to decrement the voltage to operating point 320.

Phase D then leads back to Phase A, and the cycle continues in the absence of a change in the I-V relationship of the load. This will typically continue until there is a change in the system that modifies the current-voltage relationship, for example a shift in the curve, as described herein. Evaluation of the change in current for various changes in voltages results in the determination of and setting of relatively optimal operating point. This process may proceed not only during start-up of the system, but also during operation, such that any changes induced by environmental factors, aging, or the like are automatically accommodated. If the I-V relationship changes at any point in the cycle, the magnitude and sign of the current difference will result in application of an appropriate rule to bring the system back to the relatively optimal operation point defined by the new I-V relationship.

TABLE 1

$I_2$-$I_1$

| Rule | Magnitude compared to pre-determined value | Sign of difference | Voltage Change |
| --- | --- | --- | --- |
| 1 | Greater | + | Increment |
| 2 | Smaller | + | Decrement |
| 3 | Smaller | − | Decrement |
| 4 | Greater | − | Increment |

In preferred embodiments, the I-V relationship is non-linear. In some embodiments, the non-linear I-V relationship is characterized by a knee (i.e., a change in slope), stationary point (i.e., a local maximum or minimum), saddle point, or inflection point at or near the relatively optimal operating point. In one embodiment, the knee region may be characterized by a change in the magnitude of the slope, while an inflection point may be characterized by a change in the sign (polarity) of the slope. In the example discussed in reference to FIG. 3A, the knee is in the region of operating points 320, 330, and 340, and the slope of the I-V curve below the knee (at lower operating voltages) is higher than the slope above the knee (at higher operating voltages). Thus, when applied, the rules in Table 1 drive the operating point to the knee region (the relatively optimal operating point) in response to the different slope values above and below the relatively optimal operating point. In other words, when the slope value decreases, the system is above the relatively optimal operating point and when the slope value increases, the system is below the relatively optimal operating point.

Figure 3C:
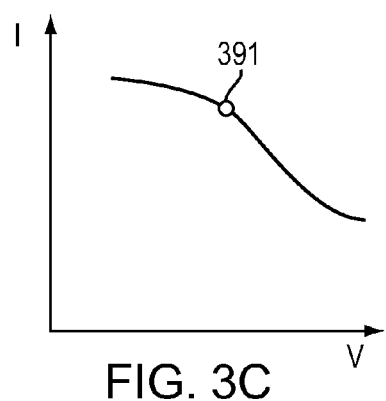
Figure 3D:
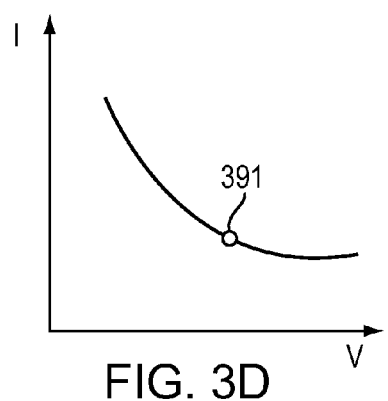
Figure 3E:
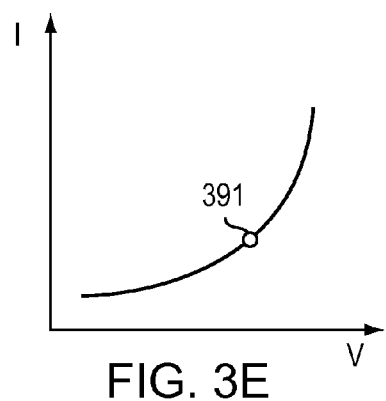

It should be understood that this approach may be generalized beyond the examples discussed in reference to FIGS. 3A and 3B and Table 1. FIGS. 3C-3E show additional examples of non-linear I-V relationships and relatively optimal operation points 391. For example, the I-V relationship shown in FIG. 3C is similar to that shown in FIG. 3A, but in this case the slope of the I-V curve below the knee (at lower operating voltages) is less than the slope above the knee (at higher operating voltages).

Figure 3F:
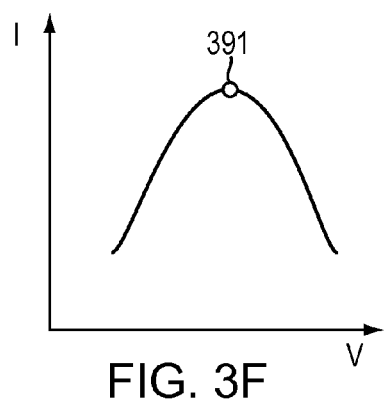
Figure 3G:
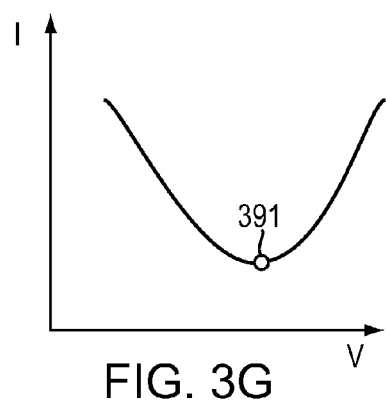

While FIGS. 3A-3E show examples having a knee region, this is not a limitation of the present invention, and in other embodiments other features may be used to identify the relatively optimal operating point. FIGS. 3F and 3G show two examples, where the relatively optimal operating point 391 corresponds to a peak and a valley respectively (i.e., to stationary points). At these points the polarity of the slope changes sign. In other words, the curve changes from being concave up to concave down. The polarity of the slope of the I-V relationship should not be confused with the sign of the difference in Table 1. The sign of the difference in Table 1 refers to the sign of the difference of currents and is used as part of the determination to increment or decrement the applied voltage.

Figure 3H:
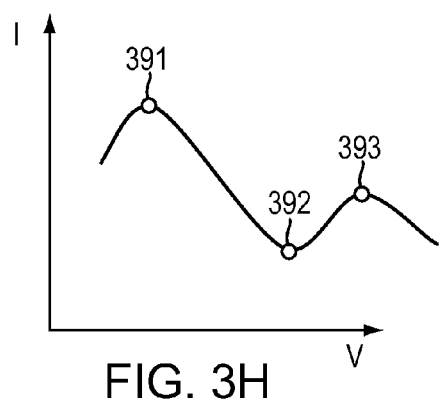

While FIGS. 3A-3G show examples that have one feature defining the relatively optimal operating point, this is not a limitation of the present invention, and in other embodiments the I-V relationship may have more than one possible knee, stationary point, or inflection point, such as points 391, 392, 393 in FIG. 3H. In this case additional rules may be configured to distinguish the different and/or desired operating points, for example including rules based on the absolute or relative magnitudes of the current value. The examples shown in FIGS. 3A-3H are not meant to be limiting, and the methods and systems described herein may be applied to systems characterized by a non-linear I-V relationship.

While the discussion above has been in reference to the I-V curve of an electrical load, this approach may be applied to other control systems, where the parameters are not the applied voltage and resulting current determined from the I-V relationship. In other words, the methods and systems described herein may be applied to systems characterized by a non-linear load curve that defines the relationship of one or more inputs and one or more responses. For example, other types of systems or relationships that the present invention may be applied to include (a) a position control system, where the response is the position and the input is a signal to adjust the position, (b) a pressure control system, for example to apply and control pressure in a mold, reaction chamber or the like, where the response is the pressure and the input is the signal to adjust the pressure, (c) a temperature control system, where the response is the temperature and the input is the signal to adjust the pressure, (d) a humidity control system, where the response is the humidity and the input is the signal to adjust the humidity, (e) a flow control system, where the response is the flow of a fluid and the input is the signal to adjust the flow, (f) a lighting control system, where the response is a lighting characteristic such as intensity, luminance, illuminance, color temperature, or the like, and the input is the signal to adjust the lighting characteristic.

In general, the approach to applying embodiments of the present invention is to determine the load relationship (between one or more inputs and one or more outputs), determine the relatively optimal operating point and determine a set of rules based on changes to the input(s) to drive the system to its relatively optimal operating point. The rules may then be embodied in hardware and/or software or other means to effect changes in the system and provide control to the relatively optimal operating point. As stated herein, an advantage of this is that in preferred embodiments it provides automatic optimization to the relatively optimal operating point for a distribution of systems, where the relatively optimal operating point may vary because of variations in component values, aging, environmental conditions, or the like.

The value of DI, the predetermined current difference value, may be influenced by a number of factors. For example, in one embodiment, DI may be set to a relatively small value in order to result in a relatively small range of operation about the operating point. For example, in the system described in reference to FIGS. 2 and 3A, DI may be less than about 1 mA, or less than about 0.5 mA, or less than about 0.1 mA. In some embodiments DI may be less than 20% of the value of the current at the operating point, or less than about 10% of the value of the current at the operating point, or less than about 2% of the value of the current at the operating point. However, the specific value of DI is not a limitation of the present invention, and in other embodiments DI may have any value.

As shown in FIG. 3A, the current-voltage curve may have a knee or bend in it, i.e., the region near points 320, 330, and 340. While point 330 identifies the 5 mA design point, it is important to note that the voltage value at which this occurs may be different for different light-emitting strings, either within the system or between different systems, resulting, for example, from manufacturing and/or operational variations. A key aspect of some embodiments of this invention is the use of the signature of the I-V curve of the load to determine and operate at a relatively optimal operating point. While FIG. 3A shows one example of an I-V curve, the shape or current or voltage values associated with the I-V curve shown in FIG. 3A are not limitations of the present invention, and in other embodiments the I-V curve may have any shape.

FIG. 3A shows how an embodiment of the present invention operates in a stable regime, where in this context stable means that the I-V curve is relatively fixed and does not shift or change shape. However, in some embodiments, the system may not be stable. For example, manufacturing variations may result in different I-V relationships for different versions of the same system, for example, because of variations in component values within the system. Also, the I-V relationship may change with time, for example as a result of changes in operating conditions (e.g., sudden or frequent system on/off cycles), environmental factors such as temperature, aging, component failure, or the like. Embodiments of the present invention accommodate these variations and operate at the relatively optimal operating point.

In the example of a light-emitting system, in some embodiments the curve relating operating current to applied voltage may shift to the left or right, while maintaining essentially the same shape. For example, components such as LEDs have manufacturing tolerances and there may be a distribution in characteristics (e.g., forward voltage) over the manufacturing output. This means that the sum of the forward voltage of all of the LEEs in different light-emitting strings may have different values, and thus a different minimum applied voltage may be required to achieve the desired current flow. For example, if the sum of the forward voltage of all of the LEEs in different light-emitting strings increases, then the minimum applied voltage to achieve the desired current increases. Conversely, if the sum of the forward voltage of all of the LEEs in different light-emitting strings decreases, then the minimum applied voltage to achieve the desired current decreases.

In addition to manufacturing tolerances (e.g., on all components in the system, for example the components making up CCE 270, not just LEEs), operational variations may also change the value of the string voltage (where the string voltage includes or consists essentially of the sum of the forward voltage of all of the LEEs in a light-emitting string as well as the voltage drop across CCE 270 and any other elements that may be in the light-emitting string). For example, as the temperature decreases, in embodiments where LEEs 110 include or consist essentially of LEDs, the forward voltage of LEEs 110 may increase. Thus in some embodiments, as the temperature decreases, the minimum applied voltage to achieve the desired current increases.

FIG. 3B shows three I-V relationships for a lighting system. Curve 302 illustrates the same relationship as the curve in FIG. 3A. Curve 306 shows an example of an I-V relationship where the string voltage is relatively smaller than that for curve 302 while curve 308 shows an example of an I-V relationship where the string voltage is relatively larger than that for curve 302.

If the system is initially operating at point 330 on curve 302 and there is a change in operational parameters to curve 308, the voltage initially remains at $V_{330}$; however, the current decreases to that associated with point 360 on curve 308 and the system is not operating at the relatively optimal operating point. At the next voltage increment time the system will act to move the voltage back to the relatively optimal operating point, which for curve 308 is point 370, in a manner substantially the same as described in reference to FIG. 3A.

If the system is initially operating at point 330 on curve 302 and there is a change in operational parameters to curve 306, the voltage remains at $V_{330}$; however, the current increases to that associated with point 390 on curve 306 and the system is not operating at the relatively optimal operating point. At the next voltage increment time the system will act to move the voltage back to the relatively optimal operating point, which for curve 306 is point 380, in a manner substantially the same as described in reference to FIG. 3A.

As discussed herein, in some embodiments such operational changes may result from environmental factors, such as a change in ambient temperature due to weather, heating or air conditioning systems, or the like. For example, systems may be installed in different environments having relatively well controlled, but different ambient temperatures, such as in an office space or home, or in a freezer case. Alternately, systems may be installed in different environments where the temperature is not well controlled, for example non-climate controlled warehouses, outdoor lighting, etc. In other situations the I-V curve may shift because of self-induced effects. For example, when a system is off, it may have a temperature close to that of the ambient temperature. When it is turned on, the various components begin to heat up, raising their temperature and possibly shifting the I-V curve. Where the system includes LEDs, the forward generally voltage drops as the LEDs heat up, resulting in a shift of the I-V curve, for example from that of curve 308 to curve 302 in FIG. 3B. In other situations, manufacturing variations in the actual value of component parts, for example LEEs 110 and/or the components of CCE 270, may result in a range of I-V curve positions and shapes, for the complete manufacturing distribution of the system.

Figure 4:
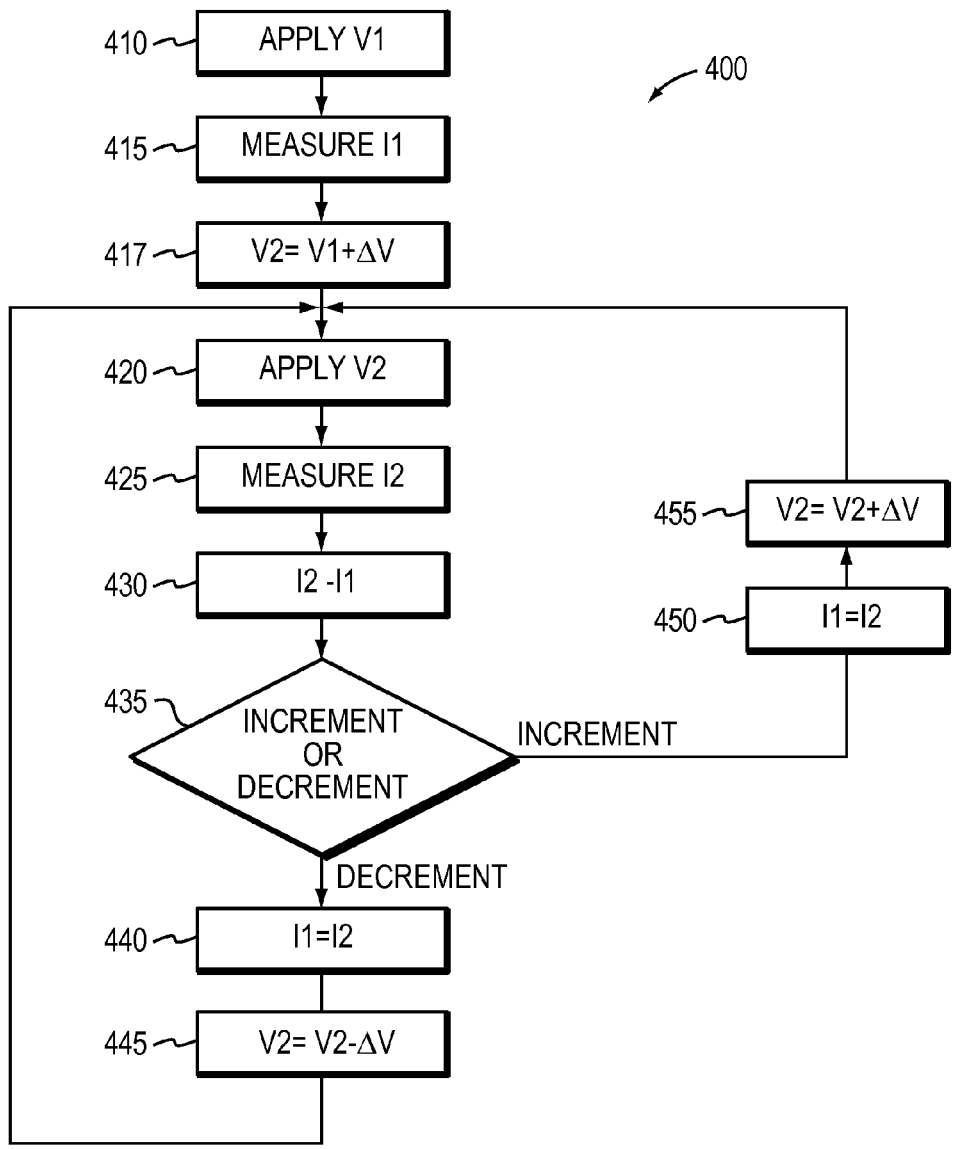
FIGS. 4 and 5 are flowcharts of illumination system operation in accordance with various embodiments of the invention.

FIG. 4 depicts a flowchart of an exemplary process 400 in accordance with various embodiments of the invention. Process 400 is shown having eleven steps; however, this is not a limitation of the present invention, and in other embodiments the invention has more or fewer steps and/or the steps may be performed in different order. In step 410, a voltage V1 is applied to the load. In step 415, the current I1, for an applied V1, is measured. In step 415, the voltage V1 is incremented to voltage V2. In step 420, the voltage V2 is applied to the load. In step 425, the current I2, for an applied V2, is measured. In step 430, the current I2 is compared to current I1. In step 435, a decision is made whether to increment or decrement the voltage, for example based on the rules of Table 1. If the decision is to increment the voltage, the process moves to step 450. In step 450, the value of current I1 is set to the value of current I2 (note that this step is for calculation or comparison purposes and is not physically setting a current value in the actual system). In step 455, the voltage V2 is incremented. After step 455, the process returns to step 420 where the new value of V2 is applied to the load, a new value of current I2 is measured (step 425) and the difference between the new values of current I2 and current I1 (which is the previous current I2 value) is determined (step 430). If in step 435 the decision is to decrement the voltage, the process moves to step 440. In step 440, the value of current I1 is set to the value of current I2. In step 455, voltage V2 is decremented. After step 445, the process returns to step 420 where the new value of voltage V2 is applied to the load, a new value of current I2 is measured (step 425) and the difference between the new value of current I2 and current I1 (which is the previous current I2 value) is determined (step 430). Note that in various embodiments it is not necessary to know (or measure) the exact value of the applied voltage after the system is started up, as the next applied voltage is modified relative to its previous value without measurement of its actual value.

Figure 5:
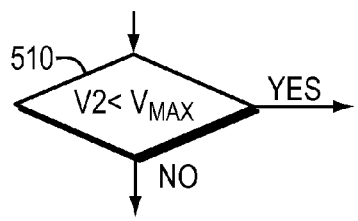

In some embodiments of process 400, the system starts with an initial voltage V1 that is known to be below the desired operating voltage point, for example point 310 in FIG. 3A. In this way the system may be configured to not exceed a certain operating voltage limit. For example a UL Class 2 certification requires the operating voltage to not exceed 60 V under operating conditions. By starting the system with voltage V1<60 V this requirement may be satisfied. An additional step, for example just prior to step 420 may include a check to ensure that the applied voltage is less than a certain value, for example 60V in a UL Class 2 system. For example, FIG. 5 shows one embodiment of an optional step to check the value of the voltage to be applied. In some embodiments this step 510 may be positioned just prior to step 420 in FIG. 4. (A similar check may also be made before step 410, upon initialization of the system, if desired.) In step 510, the value of the voltage V2 to be applied is compared to a maximum allowable value. For example in some embodiments of a UL Class 2 system where the maximum allowable voltage is 60 V, $V_{MAX}$ may be set to a value slightly less than 60 V, for example 59 V or 58 V or 57 V or the like. If the value of the voltage V2 that is to be applied is less than $V_{MAX}$ the process proceeds normally. If the value of the voltage V2 that is to be applied is equal to or larger than $V_{MAX}$ the process moves to a different branch. Depending on the design, various actions may be taken. In one embodiment, the value of voltage V2 is limited to $V_{MAX}$ or some other value less than $V_{MAX}$. In one embodiment, the system is instructed to shut down. The action taken upon voltage V2 being larger than $V_{MAX}$ is not a limitation of the present invention.

As will be understood from the description herein, a key aspect of some embodiments of this invention is that it is not necessary to know, either in advance or in real time, the "desired" applied voltage. The system uses the I-V signature to determine the relatively optimal applied voltage without knowing its specific value.

Figure 6A:
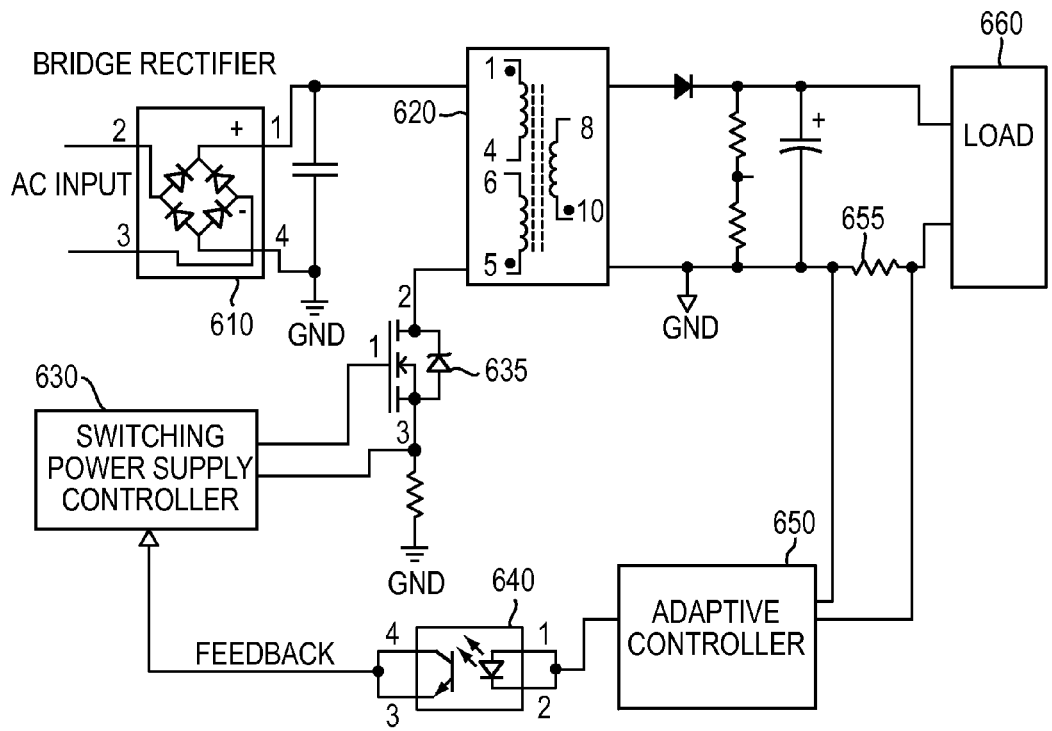
FIGS. 6A, 6B, and 7 are circuit diagrams of illumination systems in accordance with various embodiments of the invention.

Referring back to FIG. 2A, an example of a block diagram of a circuit embodying the principles of the present invention is shown. As will be understood by those skilled in the art, there are many types or configurations of variable voltage sources that may be used for variable voltage source 230 in FIG. 2A. FIG. 6A shows a circuit block diagram of one exemplary embodiment of the present invention that includes a flyback switching power supply. The circuit in FIG. 6A includes or consists essentially of a bridge rectifier 610, a switching and isolation transformer 620, a switching power supply controller 630, switching MOSFET 635, an optoisolator (or "optical isolator") 640, and an adaptive controller 650. In one embodiment, the circuit operates as follows; adaptive controller 650 determines the voltage to be applied to a load 660. A signal is sent from adaptive controller 650 through optoisolator 640 to switching power supply controller 630 to set the voltage applied to load 660 to the desired value. Switching power supply controller 630 sets the modulation frequency of switching MOSFET 635, driving the duty cycle of switching and isolation transformer 620 and resulting in the desired voltage being applied to load 660. The load current is measured by means of a shunt resistor 655. The adaptive controller follows a process to adjust to a relative optimum output voltage, as discussed herein, for example in relationship to the description of FIG. 4 and/or Table 1.

Figure 6B:
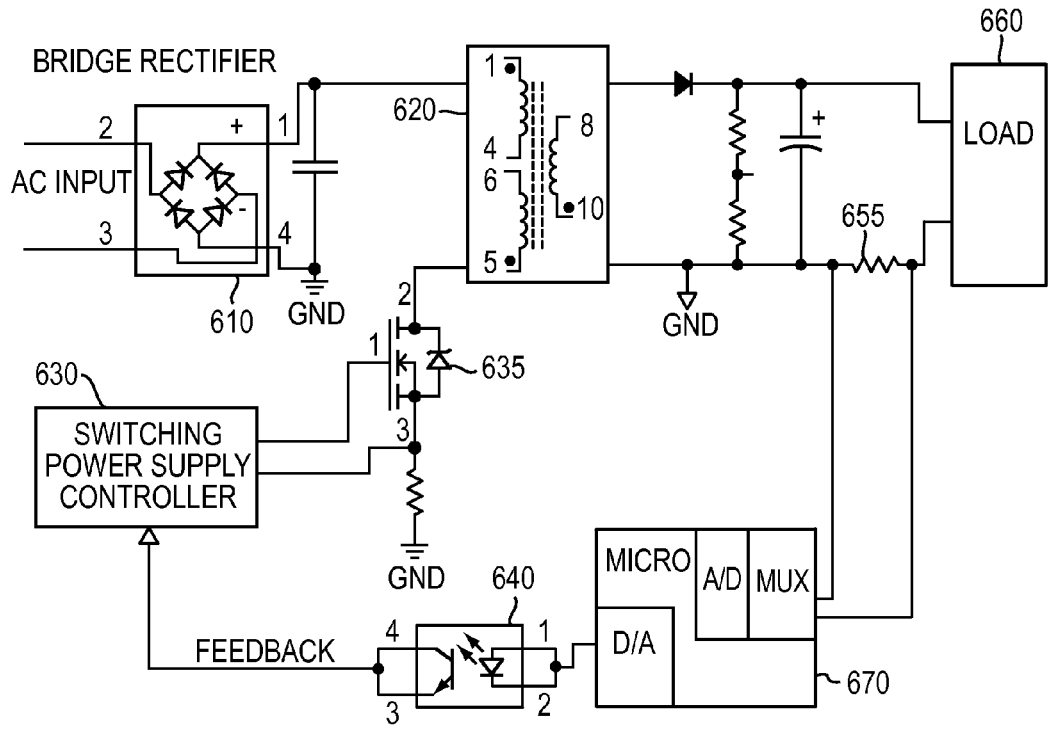

FIG. 6B shows an example of an embodiment of the circuit block diagram of FIG. 6A in which adaptive controller 650 includes or consists essentially of a microcontroller 670. In one embodiment, microcontroller 670 reads the applied current by means of shunt resistor 655 (through an optional multiplexer) and an analog to digital (A/D) converter within or external to microcontroller 670. Microcontroller 670 outputs an analog signal by means of a digital to analog (D/A) converter (within or external to microcontroller 670), which is representative of the desired applied voltage. This analog signal is applied to optoisolator 640 to set the desired output voltage to the load 660. Microcontroller 670 is programmed, for example in software or firmware, to carry out the desired process, for example that in relation to FIG. 4 and/or Table 1.

The microcontroller 670 may be a general-purpose microcontroller, but depending on implementation may alternatively be a microprocessor, peripheral integrated circuit element, a customer-specific integrated circuit (CSIC), an application-specific integrated circuit (ASIC), a logic circuit, a digital signal processor, a programmable logic device such as a field-programmable gate array (FPGA), a programmable logic device (PLD), a programmable logic array (PLA), an RFID processor, smart chip, or any other device or arrangement of devices that is capable of implementing the steps of the processes of embodiments of the invention. Moreover, some of the functions of microcontroller 670 may be implemented in software and/or as mixed hardware-software modules. Software programs implementing the functionality herein described may be written in any of a number of high level languages such as FORTRAN, PASCAL, JAVA, C, C++, C#, BASIC, various scripting languages, and/or HTML. Additionally, the software may be implemented in an assembly language directed to microcontroller 670. The software may be embodied on an article of manufacture including, but not limited to, a floppy disk, a jump drive, a hard disk, an optical disk, a magnetic tape, a PROM, an EPROM, EEPROM, field-programmable gate array, CDROM, or DVDROM. Embodiments using hardware-software modules may be implemented using, for example, one or more FPGA, CPLD, or ASIC processors.

Figure 7:
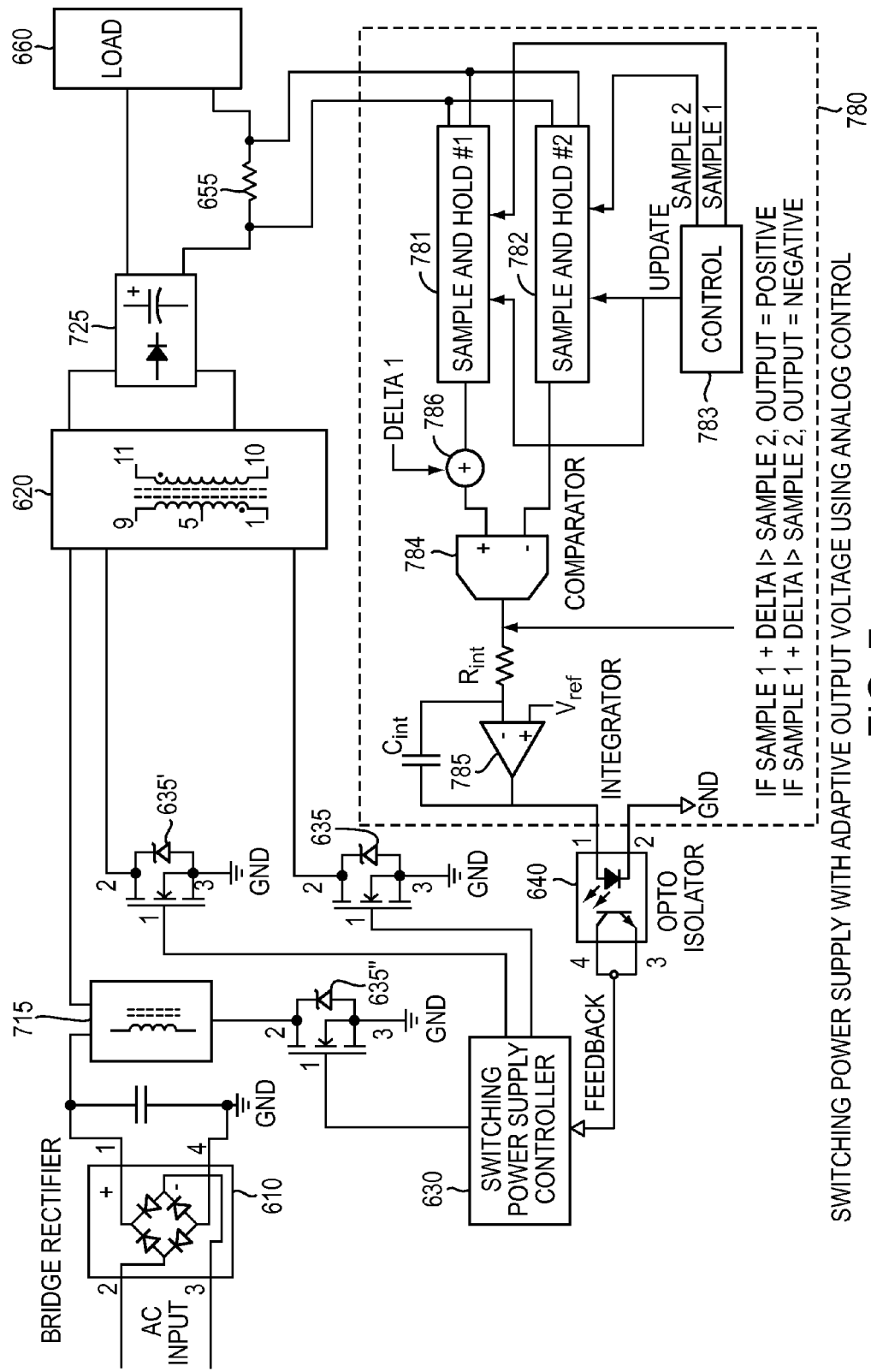

FIG. 7 shows an example of an embodiment of the circuit block diagram of FIG. 6A in which adaptive controller 650 includes or consists essentially of an analog circuit 780. Also shown in FIG. 7 is an optional power factor correction stage 715 and an optional rectification and smoothing stage 725. The embodiment shown in FIG. 7 also shows three switching transistors 635, 635', and 635"; however, this is not a limitation of the present invention, and in other embodiments fewer or more switching transistors 635 may be utilized. In some embodiments, these are controlled by switching controller 630. In the depicted embodiment, the value of the load current is sampled across shunt resistor 655 by two conventional sample-and-hold circuits 781, 782. The sample-and-hold circuits sample the load current alternately, the timing of the alternate sampling being controlled by sample-and-hold controller 783. The difference between the two current levels sampled at successive times is determined by a comparator 784 and sent to an integrator 785 that drives optoisolator 640. In operation, the comparator 784 determines the difference between the successive current values measured by sample-and-hold circuits 781, 782. In some embodiments, a small offset, delta 786, is added to (via, e.g., a voltage adder) the value of the output of sample-and-hold 781. In some embodiments, delta 786 serves the same purpose as the predetermined value DI as discussed herein. The difference between [sample-and-hold 781+delta 786] and sample and hold 782 is sent to comparator 784. If [sample and hold 781+delta 786] is greater than sample-and-hold 782, or if sample-and-hold 781−sample-and-hold 782 is greater than delta 786, the output of comparator 784 is positive, which then drives integrator 785 output positive, which increases the voltage to load 660. If [sample-and-hold 781+delta 786] is less than sample-and-hold 782, or if sample-and-hold 781−sample-and-hold 782 is less than delta 786, the output of comparator 784 is negative, which then drives integrator 785 output negative, which decreases the voltage to load 660. In this way, if the change in load current from one sample period to the next is greater than delta 786, the voltage is changed. If the change in load current from one sample period to the next is less than delta 786, integrator 785 drives the load voltage lower, such that at the next or successive sampling interval, the change in load current between sample periods is greater than delta 786, driving the voltage back up. In this way the load voltage oscillates around the relative optimal operating point.

The systems shown in FIGS. 6A-6C and FIG. 7 show two embodiments of circuits that may be used to embody elements of the present invention, although alternative systems with similar functionality are also within the scope of the invention. As will be understood by those skilled in the art, there are many electrical topologies for switching power supplies, and the specific topology of the power supply is not a limitation of the present invention.

Figure 8:
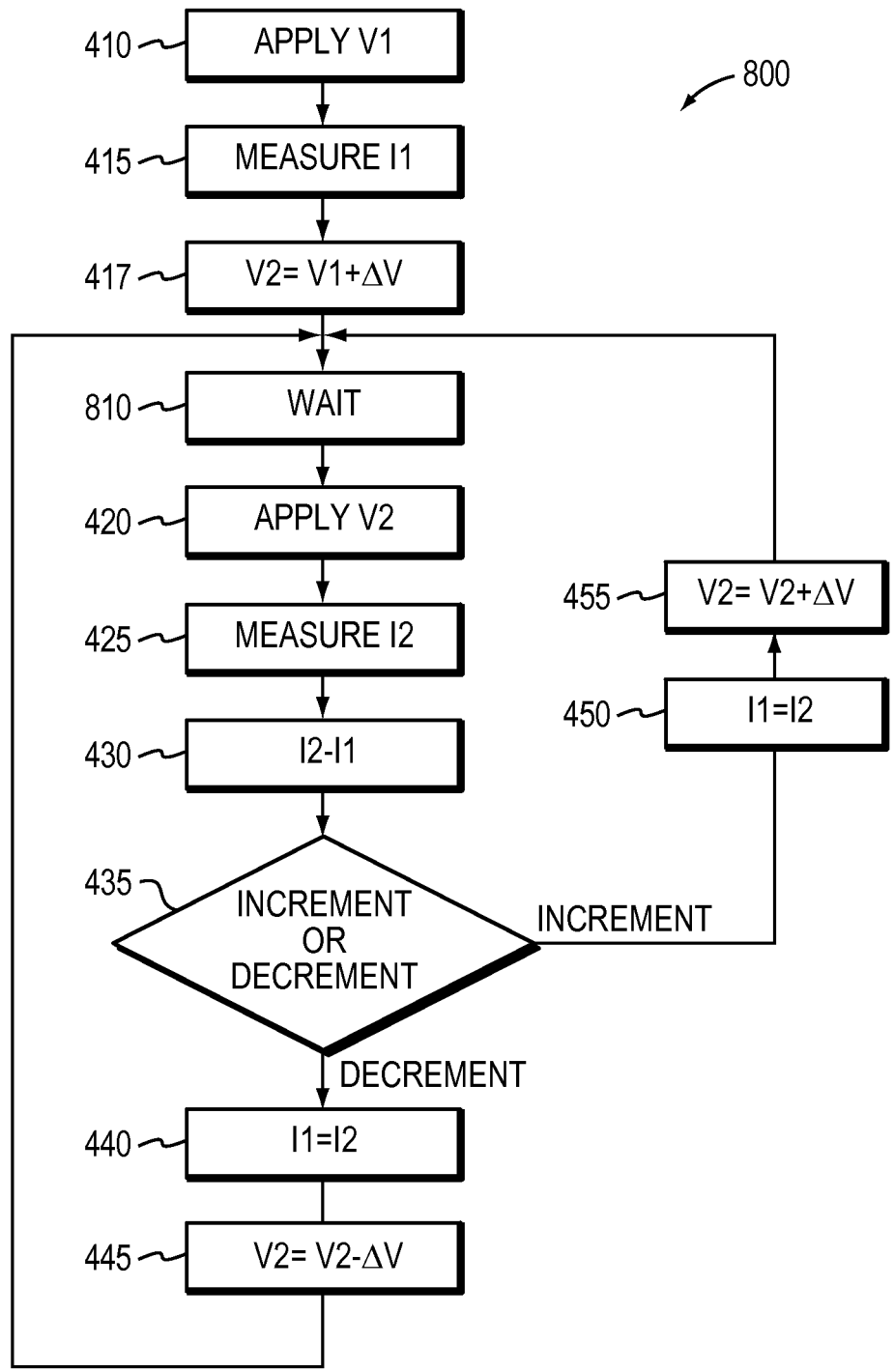
FIGS. 8 and 9 are flowcharts of illumination system operation in accordance with various embodiments of the invention.

As will be recognized from the description in reference to FIGS. 3A and 4, in some embodiments once the system is near its relative optimal operating point and the I-V relationship is substantially stable, the adaptive power system may cycle back and forth about the relative optimal operating point. For example, in the example in reference to FIG. 3A, the operating point cycles between points 320 and 340 through point 330. In some embodiments, a fixed or variable wait time may be added to the process, for example the process shown in reference to FIG. 4, to reduce the cycle frequency. FIG. 8 is a flowchart of an exemplary process 800 in accordance with various embodiments of the invention.

Process 800 is similar to process 400 shown in FIG. 4, with the inclusion of a wait step 810 just before step 420, Apply V2. Process 800 is shown having twelve steps; however, this is not a limitation of the present invention, and in other embodiments the invention has more or fewer steps and/or the steps may be performed in different order. In some embodiments, wait step 810 may be fixed, for example wait step 810 may range from about 10 milliseconds (ms) to about 10 seconds, although the specific value of a fixed wait time is not a limitation of the present invention. In some embodiments, wait step 810 may be variable. For example, in some embodiments wait step 810 may be relatively short during start-up of the system and may increase with time. For example, in some embodiments wait step may have a value between about 1 ms and about 100 ms during the start-up time and may have a wait step value between about 100 ms and about 1 hour or 1 day or more during operation. In some embodiments, the start-up period may be in the range of about 10 seconds to about 5 minutes (from start-up of the system). However, the wait times during start-up and operation, as well as the start-up period are not limitations of the present invention, and in other embodiments these may have any value. In some embodiments, these values may be in part determined by system characteristics and in part by ambient conditions. For example, the start-up period in some embodiments may be determined in part by the time required for the system to thermally stabilize after being turned on.

In some embodiments, the $\Delta V$ voltage increment may be fixed while in other embodiments the $\Delta V$ increment may be variable. In some embodiments, the $\Delta V$ increment may be in the range of about 0.05 V to about 5 V; however, the $\Delta V$ increment value is not a limitation of the present invention. In some embodiments, the $\Delta V$ increment is determined as a percentage of the operating voltage. For example, $\Delta V$ may be in the range of about 10% of the operating voltage to about 0.01% of the operating voltage; however, the $\Delta V$ increment value as a percentage of the operating voltage is not a limitation of the present invention. In some embodiments, the $\Delta V$ increment may be relatively small during start-up of the system and may increase with time. For example, in some embodiments the $\Delta V$ increment may have a value between about 0.05 V and about 0.25 V (or between about 0.01% to about 0.5% of the operating voltage) during the start-up time and may have a $\Delta V$ increment value between about 0.25 V and about 1 V (or between about 0.5% to about 2% of the operating voltage) during operation. In some embodiments, the $\Delta V$ increment may have a value between about 0.25 V and about 1 V (or between about 0.5% to about 2% of the operating voltage) during the start-up time and may have a $\Delta V$ increment value between about 0.05 V and about 0.25 V (or between about 0.01% to about 0.5% of the operating voltage) during operation. In some embodiments the start-up period may be in the range of about 10 seconds to about 5 minutes (from start-up of the system). However, the wait times during start-up and operation, as well as the start-up period, are not limitations of the present invention, and in other embodiments these may have any value. In some embodiments, these values may be in part determined by system characteristics and in part by ambient conditions. For example, the start-up period in some embodiments may be determined in part by the time required for the system to thermally stabilize (i.e., reach an approximately constant temperature given ambient conditions and heat generated by the system itself) after being turned on.

In some embodiments, the pre-determined value DI used to evaluate the current difference $I_2-I_1$ may be fixed, while in other embodiments it may be variable. In some embodiments, the pre-determined value DI used to evaluate $I_2$-$I_1$ may be in the range of about 0.01 mA to about 1 mA; however, the pre-determined value DI used to evaluate $I_2$-$I_1$ is not a limitation of the present invention. In some embodiments, DI may be about or less than 20% of the value of the current at the operating point, or about or less than about 10% of the value of the current at the operating point, or about or less than about 2% of the value of the current at the operating point. However, the specific value of DI is not a limitation of the present invention, and in other embodiments DI may have any value.

For example, in some embodiments the pre-determined value used to evaluate the current difference $I_2$-$I_1$ may be variable. For example in one embodiment, the current difference $I_2$-$I_1$ may be relatively small during start-up of the system and may increase with time. For example, in some embodiments the pre-determined value used to evaluate $I_2$-$I_1$ may have a value between about 0.1 mA and about 1 mA during the start-up time and may have a value between about 0.01 mA and about 0.1 mA during operation. In some embodiments, the start-up period may be in the range of about 10 seconds to about 5 minutes (from start-up of the system). However, the pre-determined value used to evaluate $I_2$-$I_1$ during start-up and operation, as well as the start-up period, are not limitations of the present invention, and in other embodiments these may have any value. In some embodiments, these values may be in part determined by system characteristics and in part by ambient conditions. For example, the start-up period in some embodiments may be determined in part by the time required for the system to thermally stabilize after being turned on. Table 2 shows an example of a two-level system with different possibilities of the wait time, $\Delta V$ increment and/or pre-determined value used to evaluate $I_2$-$I_1$ for two different periods, start-up and operation. The values discussed with respect to this example and in connection with Table 2 are exemplary values; the specific values are not limitations of the present invention.

TABLE 2

| Period | Wait Time (s) | $\Delta V$ increment (V) | Pre-determined I2-I1 value (mA) |
|---|---|---|---|
| Start-up | 0.001-0.1 | 0.05-0.25 | 0.1-1.0 |
| Operation | 0.1-3600 | 0.25-1.0 | 0.01-0.1 |

While the discussion above relative to different wait times, $\Delta V$ increments, and the pre-determined value used to evaluate $I_2$-$I_1$ has been with reference to a two-level system (that is a system with two periods having different characteristics), this is not a limitation of the present invention, and in other embodiments more than two levels may be utilized. While the discussion above relative to two or more periods has been with reference to wait times, $\Delta V$ increments, and the pre-determined value used to evaluate $I_2$-$I_1$, this is not a limitation of the present invention, and in other embodiments other parameters may have different values during these periods as well. In some embodiments, only one or several parameters have different values during different periods.

In some embodiments, various adaptive parameters may have discrete values, while in other embodiments they may vary continuously. Here "adaptive parameters" are parameters that control or direct the operation of the adaptive power supply system including but not limited to wait times, $\Delta V$ increments, and the pre-determined value used to evaluate $I_2$-$I_1$.

Figure 9:
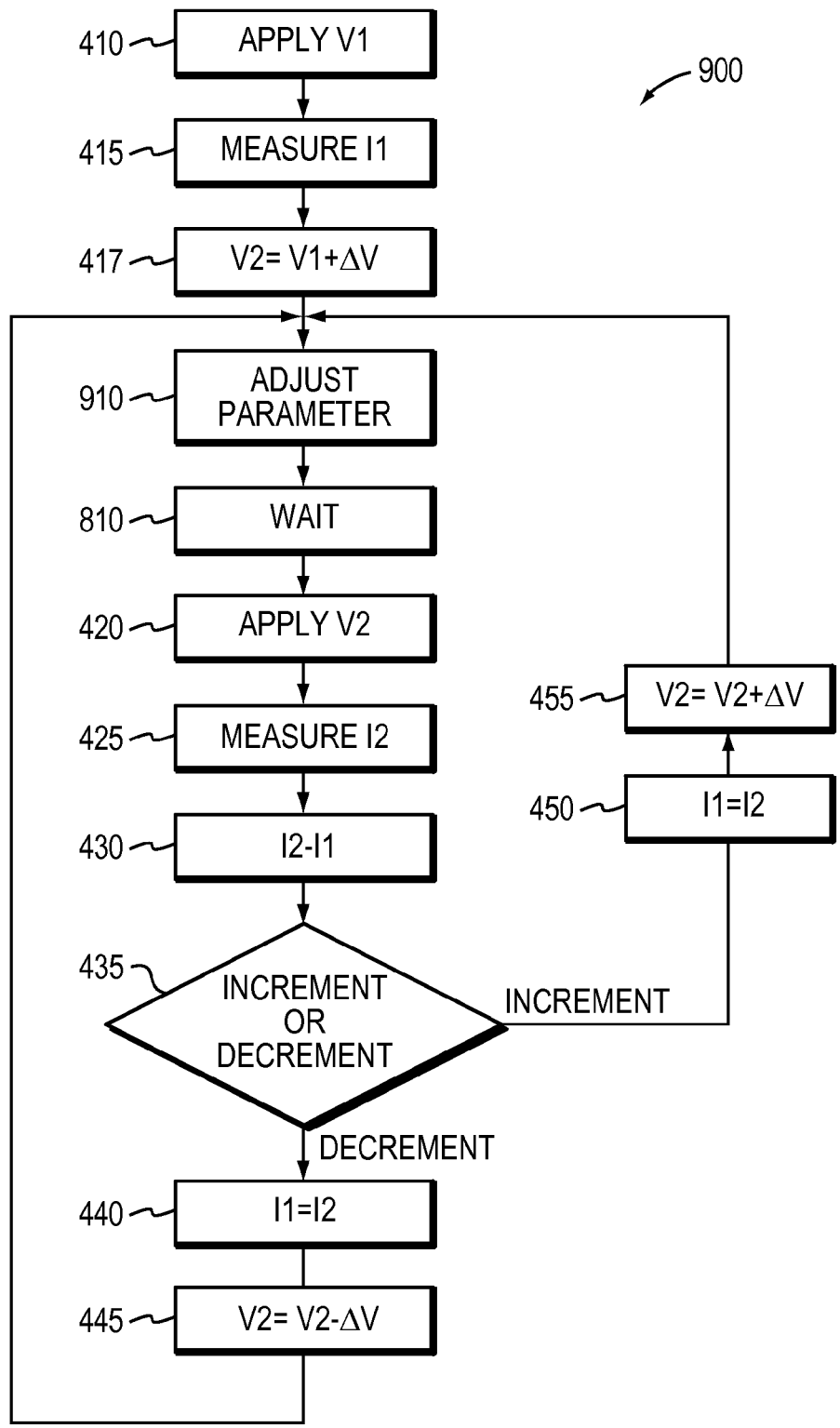

In some embodiments, adaptive parameters may be changed dynamically, that is for example in response to various states of the process, as opposed to being changed by time period, as discussed above. For example, FIG. 9 depicts a flowchart of an exemplary process 900 in accordance with various embodiments of the invention. Process 900 is similar to process 800 shown in FIG. 8; however, in process 900 one or more parameters (for example Wait Time, $\Delta V$, DI) may be changed based on a determination in an adjust-parameter step 910. For example, in an embodiment in which the system is relatively stable and is cycling back and forth around a central current-voltage point, as described in reference to FIG. 3C, step 910 may count how many times the system has cycled back and forth around substantially the same points. When the cycle count reaches a maximum, the wait time may be changed, for example increased, to reduce the amount of cycling. In another example, when the system is relatively stable, the value of $\Delta V$ may be reduced to more closely approach the relatively optimal operating point. In another example, DI may be changed. For example, DI/$\Delta V$ may be considered to be a measure of the slope of the I-V relationship, and in some embodiments, DI may be modified to improve the operation of process 900, for example to better match the measured change in current as a response to $\Delta V$ changes to the slope of the I-V curve. The forgoing examples are for a relatively stable system. If there is a shift in the system relationship, for example as described in reference to FIG. 3B, then there is a disruption in the response cycle described in reference to FIG. 3C and in some embodiments, in step 910 one or more parameters are set to their default value or set to another value dependent on the nature and extent of the disruption. The number and function of the steps shown in process 900 is exemplary and are not a limitation of the present invention, and in other embodiments the invention has more or fewer steps and/or the steps may be performed in different order.

Example 1

In this example, the number of stable cycles (shown in FIG. 3C) is counted. For every X cycles around a relatively stable operating point (X is an integer, for example 10, 50, 100, or another number), the wait time increases. For example, in one embodiment the wait time may double after X cycles. Taking the case where X is 50, if the system cycles 50 times around the operating point in a relatively stable fashion, the wait time doubles. If it cycles another 50 times around the operating point in a relatively stable fashion, the wait time doubles again (4× the original value). As long as the system is stable, the wait time increases, reducing the cycle frequency. If the system detects a different pattern (e.g., current-voltage relationship), then step 910 sets the wait time back to the starting default value. In the examples below, the specific values are representative and other values may be used.

Example 2

In this example, the number of stable cycles (shown in FIG. 3C) is counted. For every X cycles around a relatively stable operating point (X is an integer, for example 10, 50, 100, or another number), $\Delta V$ is decreased. For example, in one embodiment the $\Delta V$ is decreased by 10%, 25%, 50%, or some other amount. Taking the case where X is 50 and the $\Delta V$ decrease is 10%, if the system cycles 50 times around the operating point in a relatively stable fashion, then $\Delta V$ is set to 0.9$\Delta V$. If it cycles another 50 times around the operating point in a relatively stable fashion, $\Delta V$ decreases again to 0.81$\Delta V$.

As long as the system is stable, ΔV decreases. This permits the system to take finer and finer voltage steps to more closely approach the relatively optimal operating point. In most embodiments, it is preferable to set a minimum ΔV value. If the system detects a different pattern (e.g., current-voltage relationship), then step 910 sets ΔV back to the starting default value.

Example 3

In this example the number of stable cycles (shown in FIG. 3C) is counted. For every X cycles around a relatively stable operating point (X is an integer, for example 10, 50, 100, or another number), ΔV is decreased until a minimum ΔV value is reached, for example 5 cycles of monotonic ΔV reduction. After that, as long as the system is stable, the wait time is then increased. For example, in one embodiment the ΔV may be decreased by 10% in each of 5 steps. Thus, in a relatively stable system the ΔV values are ΔV, 0.9 ΔV, 0.81 ΔV, 0.73 ΔV and 0.66 ΔV. If the system goes through 5 cycles of monotonic ΔV reduction, the value of ΔV will be 0.59 ΔV and will remain fixed as long as the system is stable. If the system is stable for another 50 cycles, then the wait time is increased, for example the wait time doubles. If it cycles another 50 times around the operating point in a relatively stable fashion, the wait time doubles again (4× the original value). As long as the system is stable, the wait time increases, reducing the cycle frequency. If the system detects a different pattern, then step 910 sets ΔV and the wait time back to the starting default value.

The discussion with respect to FIG. 9 has provided an example where the wait time WAIT is increased; however, this is not a limitation of the present invention, and in other embodiments the wait time WAIT may be decreased or decreased and increased at different times by any amount. The discussion with respect to FIG. 9 has provided an example where the adaptive parameter WAIT is dynamically changed during process 900; however, this is not a limitation of the present invention, and in other embodiments other adaptive parameters, for example ΔI and ΔV, may also be changed. The discussion with respect to FIG. 9 has provided an example where one adaptive parameter (WAIT) is dynamically changed during process 900; however, this is not a limitation of the present invention, and in other embodiments more than one adaptive parameter may be changed dynamically, or one or more adaptive parameters may be fixed or one or more adaptive parameters may be changed based on time periods.

Figure 10:
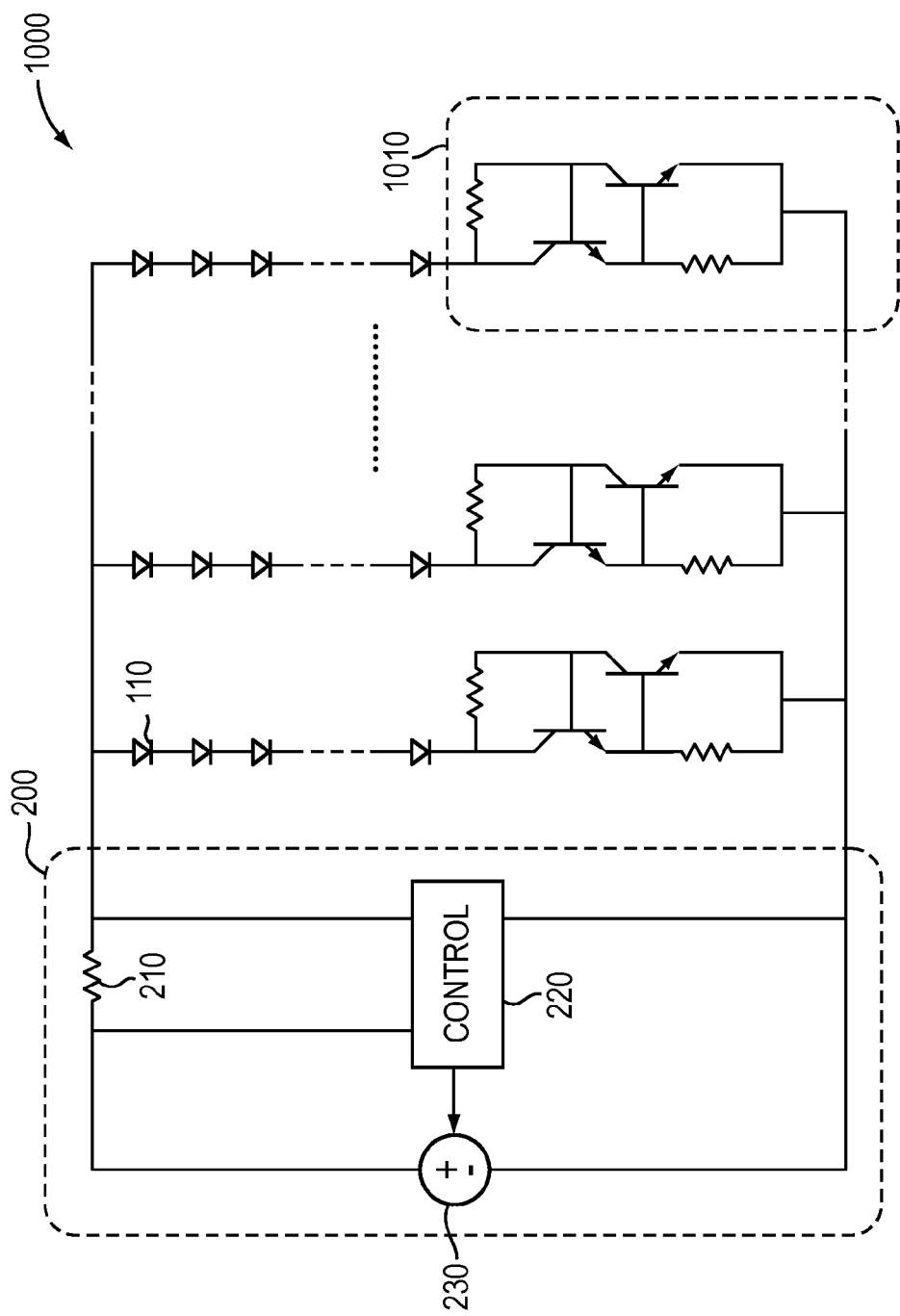
FIG. 10 is a partial circuit diagram of an illumination system in accordance with various embodiments of the invention.

FIG. 10 shows an example of a lighting system 1000 incorporating an adaptive power system 200. Similar to the system shown in FIG. 2A, adaptive power system 200 includes or consists essentially of variable voltage supply 230, controller 220, and a current sensing system 210 represented in FIG. 10 as a current sense resistor. Adaptive power system 200 powers a light-emitting array that includes or consists essentially of at least one string of series-connected LEEs 110, where each string also includes a CCE 1010. In the example shown in FIG. 10 the light-emitting array includes or consists essentially of two or more strings of series-connected LEEs 110, and the strings are electrically coupled in parallel. In this embodiment, CCE 1010 includes or consists of two resistors and two transistors, for example as shown in connection with FIG. 2C; however, this is not a limitation of the present invention, and in other embodiments CCE 1010 may include or consist of one or more passive components, one or more active components, a combination of active and passive elements, an integrated circuit, or any other mechanism for controlling the current. In operation CCEs 1010 act to control the current through each string at a particular design point, relatively independent of the voltage value applied to the string.

As may be seen from FIG. 10, the current sensed by resistor 210 is approximately the sum of the current through all of the strings. While this value changes with the number of strings incorporated into the system, the signature or shape of the I-V relationship typically does not substantially change with the number of strings incorporated into the system. As has been discussed herein, the signature of the I-V relationship, and not its absolute value, is used to drive the voltage to the relatively optimal operating point or relative optimum operating voltage. Thus, systems may include or incorporate one or more light-emitting strings or one or more groups of light-emitting strings, each having somewhat different characteristics, for example the forward voltage of LEEs 110, and the adaptive power system 200 will adjust and control the voltage to the relatively optimal operating point. In operation, additional light-emitting strings or groups of light-emitting strings may be added to or removed from the system and adaptive power system 200 will self-adjust to the relatively optimal operating voltage.

In some embodiments of the present invention, it may be desirable to have different groups of light-emitting strings operating at different current levels. In some embodiments, these may be grouped together on one substrate or lightsheet, while in other embodiments these may be on separate substrates or separate lightsheets. In some embodiments, the forward voltage of LEEs 110 varies with current, for example in the case where a LEE 110 includes or consists essentially of a LED, in some embodiments the current is exponentially related to the applied voltage. As the current increases, so does the forward voltage. Thus, for a fixed number of LEEs 110 in a light-emitting string, the string voltage may increase with increased string current. In some embodiments, different substrates or lightsheets may be designed to operate at different current levels, for example to achieve different light output power densities (radiant flux or luminous flux), and there will be a different relatively optimal operating voltage for each type of sheet (current drive level). The ability of the adaptive power system to vary the voltage in response to the current needs, and the fact that the desired value does not need to be programmed into the adaptive power supply, means that one adaptive power supply system may be able to drive, at a relatively optimal voltage level to achieve a high efficiency, a variety of lighting systems or lightsheets that operate at different current levels with no change to the adaptive power supply. In this embodiment, the current is set by current control elements 1010 on the lightsheet and the adaptive power supply provides a variable voltage that is dynamically adjusted to the relatively optimal voltage level of that particular lighting system or lightsheet, based only on the signature of the I-V relationship, without the necessity of knowing the required actual current or voltage values.

Table 3 lists parameters for an exemplary lighting system including or consisting essentially of two different parts using a fixed voltage system. One part is a lightsheet including or consisting of light-emitting strings including or consisting essentially of 20 GaN-based LEDs having a low, nominal and high forward voltage at about 5 mA of about 2.65, 2.75, and 2.85 V respectively. In other words, there is a distribution in the forward voltage value at about 5 mA as a result of manufacturing or operational variations (for example changes in ambient temperature) and the lighting system needs to operate correctly across the entire distribution. This means that it is theoretically possible to have all LEDs in one string have the low value for forward voltage and in another string all the LEDs have the high value. While this scenario may be relatively unlikely, without additional sorting and binning, it is not possible to guarantee that such a situation will not occur, and thus it is included in the design parameters. Similarly, Table 3 shows low, medium, and high forward voltages for the second part, including or consisting essentially of 18 GaN based LEDs having a low, nominal, and high forward voltage at about 15 mA of about 2.85, 2.95, and 3.05 V respectively. Table 3 also shows the minimum voltage required to operate CCE 270, which is about 1.8 V at about 5 mA and about 2.0 V at about 15 mA. The total voltage drop across the LEDs and CCE 270 is the sum of the product of the number of LEDs per string and the forward voltage and the voltage drop across CCE 270. The row labeled "Additional tolerance" is an extra 0.5 V that is added to accommodate any other variations as a result of other manufacturing or operational variation. The "Minimum required voltage" is then the sum of the "Additional tolerance" and the "LEDs+CCE voltage," that is the minimum voltage required to operate the circuit at the design point. As may be seen by observing the minimum required voltage for the different parts with the different distributions, the minimum required voltage varies from about 53.8 V to about 59.3 V. In order to power this lighting system with a fixed voltage system, the fixed voltage value is large enough to power the scenario requiring the highest voltage, which in this case is the high voltage distribution of the 5 mA part. For this example, a fixed applied voltage of 59.5 V is chosen. As discussed herein, the voltage not dropped across the LEDs is dropped across CCE 270, and this value is shown in Table 3 for the different scenarios. As may be seen, the voltage dropped (and dissipated by) CCE 270 ranges from about 2.5 V to about 8.2 V. The power dissipated in CCE 270 may be calculated as the product of the voltage drop across CCE 270 and the current through CCE 270. The efficiency of CCE 270 may also be calculated, for example as the ratio of the voltage drop across the LEDs divided by the fixed applied voltage, and this is shown for each scenario in Table 3. As may be seen, there is a wide range in efficiencies, depending on the part and the LED forward voltage distribution, ranging from about 86.2% to about 95.8%. The efficiency is higher in the scenarios in which the voltage drop across CCE 270 is relatively low.

Now consider a similar lighting system, but operated with an adaptive power supply of the present invention, as shown in Table 4. The same parts and distributions are used as in the example of Table 3; however, in this case the voltage applied to each lightsheet is not fixed, as in the example in relation to Table 3, but adapts to the relatively optimal minimal voltage. In this example the relatively optimal minimal voltage is defined as the sum of 0.5 V, the voltage drop across the LEDs, and the voltage drop required to operate CCE 270 and is shown in Table 4 as the "Adaptive voltage." As may be seen from Table 4, the voltage drop across CCE 270 with an adaptive power supply is uniformly small for all scenarios, resulting in a higher efficiency and a much tighter distribution in efficiency values for the different scenarios. In this example the efficiency ranges from about 95.4% to about 96.1% for adaptive voltages ranging from 53.8 V to 59.3 V. In this example the adaptive voltage supply results in an efficiency greater than about 95% for an adaptive voltage range of about 10% of the desired operating point.

Figure 11:
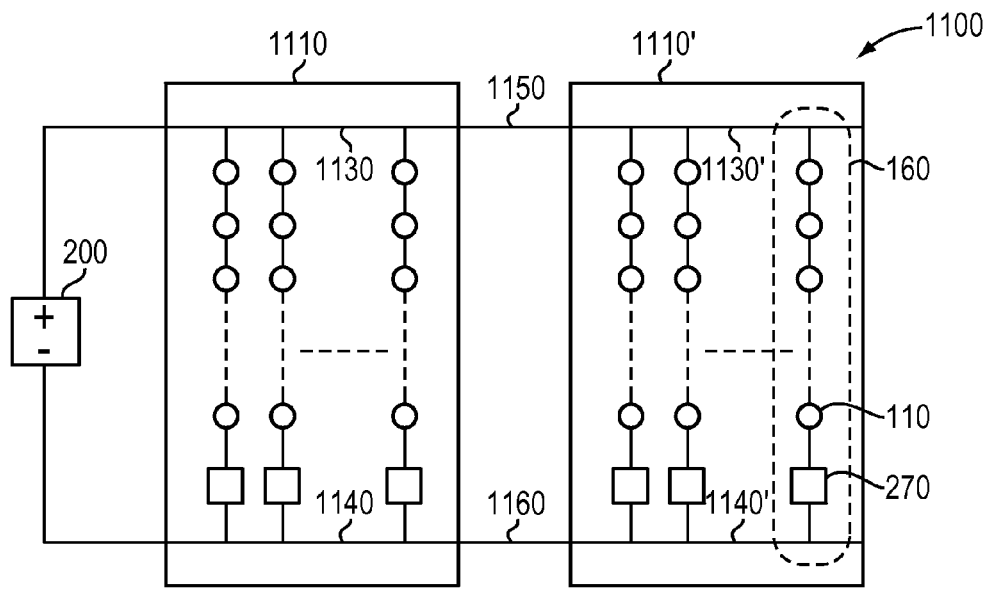
FIG. 11 is a schematic diagram of circuitry of an illumination system in accordance with various embodiments of the invention.

FIG. 11 shows an example of a lighting system 1100 including or consisting essentially of an adaptive power supply 200 and two or more lightsheets 1110 and 1110'. Each lightsheet 1110 and 1110' includes one or more light-emitting strings 160 electrically coupled in parallel, each light-emitting string 160 including or consisting essentially of one or more light-emitting elements 110 electrically coupled in series with at least one CCE 270, as described in the '807 application.

TABLE 3

|  | Unit | Low | Nominal | High | Low | Nominal | High |
| --- | --- | --- | --- | --- | --- | --- | --- |
| Current | mA | 5 | 5 | 5 | 15 | 15 | 15 |
| Forward voltage | V | 2.65 | 2.75 | 2.85 | 2.85 | 2.95 | 3.05 |
| # LEDs per string |  | 20 | 20 | 20 | 18 | 18 | 18 |
| Total LED voltage | V | 53.0 | 55.0 | 57.0 | 51.3 | 53.1 | 54.9 |
| Minimum voltage to operate CCE | V | 1.8 | 1.8 | 1.8 | 2.0 | 2.0 | 2.0 |
| LEDs + CCE voltage | V | 54.8 | 56.8 | 58.8 | 53.3 | 55.1 | 56.9 |
| Additional tolerance | V | 0.5 | 0.5 | 0.5 | 0.5 | 0.5 | 0.5 |
| Minimum required voltage | V | 55.3 | 57.3 | 59.3 | 53.8 | 55.6 | 57.4 |
| Fixed applied voltage | V | 59.5 | 59.5 | 59.5 | 59.5 | 59.5 | 59.5 |
| Voltage across CCE for fixed applied voltage | V | 6.5 | 4.5 | 2.5 | 8.2 | 6.4 | 4.6 |
| CCE efficiency for fixed applied voltage | % | 89.1% | 92.4% | 95.8% | 86.2% | 89.2% | 92.3% |

TABLE 4

|  | Unit | Low | Nominal | High | Low | Nominal | High |
| --- | --- | --- | --- | --- | --- | --- | --- |
| Current | mA | 5 | 5 | 5 | 15 | 15 | 15 |
| Forward voltage | V | 2.65 | 2.75 | 2.85 | 2.85 | 2.95 | 3.05 |
| # LEDs per string |  | 20 | 20 | 20 | 18 | 18 | 18 |
| Total LED voltage | V | 53.0 | 55.0 | 57.0 | 51.3 | 53.1 | 54.9 |
| Minimum voltage to operate CCE | V | 1.8 | 1.8 | 1.8 | 2.0 | 2.0 | 2.0 |
| LEDs + CCE voltage | V | 54.8 | 56.8 | 58.8 | 53.3 | 55.1 | 56.9 |
| Additional tolerance | V | 0.5 | 0.5 | 0.5 | 0.5 | 0.5 | 0.5 |

TABLE 4-continued

|  | Unit | Low | Nominal | High | Low | Nominal | High |
|---|---|---|---|---|---|---|---|
| Adaptive voltage | V | 55.3 | 57.3 | 59.3 | 53.8 | 55.6 | 57.4 |
| Voltage across CCE for adaptive voltage | V | 2.3 | 2.3 | 2.3 | 2.5 | 2.5 | 2.5 |
| CCE efficiency for fixed applied voltage | % | 95.8% | 96.0% | 96.1% | 95.4% | 95.5% | 95.6% |

Each lightsheet 1110 includes at least two power conductors 1130, 1140 that distribute power from adaptive power supply 200 to strings 160. At least one lightsheet 1110 is electrically coupled to adaptive power supply 200. In the example shown in FIG. 11, power conductor 1130 is electrically coupled to the positive terminal of adaptive voltage supply 200, while power conductor 1140 is electrically coupled to the negative terminal of adaptive voltage supply 200. However, this is not a limitation of the present invention, and in other embodiments different electrical configurations and different number of power conductors 1130, 1140 on lightsheet 1110 may be utilized. Additional lightsheets, for example lightsheet 1110', may be electrically coupled to the system by electrically coupling like power conductors, for example through connections 1150, 1160, where connection 1150 electrically couples power conductors 1130 and 1130' and connection 1160 electrically couples power conductors 1140 and 1140'. While FIG. 11 shows two lightsheets 1110 and 1110', this is not a limitation of the present invention, and in other embodiments more than two lightsheets may be utilized. Some embodiments of the present invention may include multiple adaptive power supplies 200, each attached to one or more lightsheets 1110.

Figure 12:
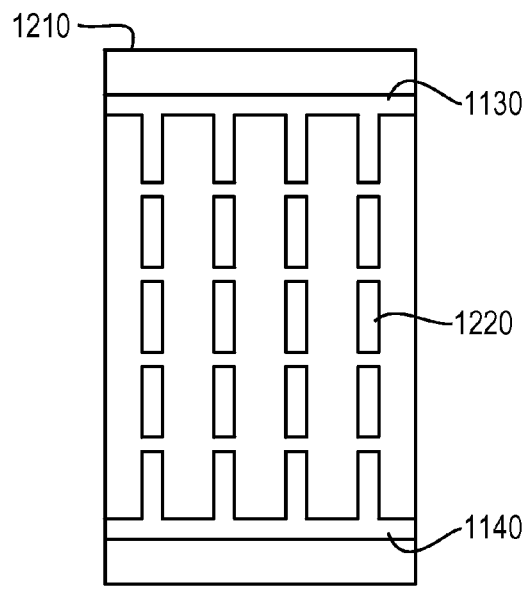
FIG. 12 is a schematic diagram of a portion of an illumination system in accordance with various embodiments of the invention.

In some embodiments, lightsheets 1110 may each include a substrate 1210 over which conductive traces 1220, 1130, 1140 have been formed to provide interconnection between LEEs 110 and CCE 270, as shown in FIG. 12. In some embodiments, substrate 1210 may be flexible, while in other embodiments substrate 1210 may be rigid or substantially rigid. Substrate 1210 may include or consist essentially of a semicrystalline or amorphous material, e.g., polyethylene naphthalate (PEN), polyethylene terephthalate (PET), polycarbonate, polyethersulfone, polyester, polyimide, polyethylene, fiberglass, FR4, metal core printed circuit board, (MCPCB), and/or paper. Substrate 1210 may include multiple layers, e.g., a deformable layer over a rigid layer, for example, a semicrystalline or amorphous material, e.g., PEN, PET, polycarbonate, polyethersulfone, polyester, polyimide, polyethylene, and/or paper formed over a rigid substrate for example comprising, acrylic, aluminum, steel and the like. Depending upon the desired application for which embodiments of the invention are utilized, substrate 1210 may be substantially optically transparent, translucent, or opaque. For example, substrate 1210 may exhibit a transmittance or a reflectivity greater than 70% for optical wavelengths ranging between approximately 400 nm and approximately 700 nm. In some embodiments, substrate 1210 may exhibit a transmittance or a reflectivity of greater than 70% for one or more wavelengths emitted by LEEs 110. Substrate 1210 may also be substantially insulating, and may have an electrical resistivity greater than approximately 100 ohm-cm, greater than approximately $1 \times 10^6$ ohm-cm, or even greater than approximately $1 \times 10^{10}$ ohm-cm. In some embodiments substrate 1210 may have a thickness in the range of about 10 µm to about 200 µm.

Conductive elements, i.e., conductive traces 1220, 1130, 1140, may be formed via conventional deposition, photolithography, and etching processes, plating processes, lamination, lamination and patterning, evaporation sputtering or the like, or they may be formed using a variety of different printing processes. For example, conductive traces 1220, 1130, 1140 may be formed via screen printing, flexographic printing, ink-jet printing, and/or gravure printing. Conductive traces 1220, 1130, 1140 may include or consist essentially of a conductive material (e.g., an ink or a metal, metal film or other conductive materials or the like), which may include one or more elements such as silver, gold, aluminum, chromium, copper, and/or carbon. Conductive traces 1220, 1130, 1140 may have a thickness in the range of about 50 nm to about 1000 µm, or more preferably in the range of about 3 µm to about 50 µm. In some embodiments, the thickness of conductive traces 1220, 1130, 1140 may be determined by the current to be carried thereby. While the thickness of one or more of conductive traces 1220, 1130, 1140 may vary, the thickness is generally substantially uniform along the length of the trace to simplify processing. However, this is not a limitation of the present invention, and in other embodiments the thickness and/or material of conductive traces 1220, 1130, 1140 may vary. In some embodiments, all or portions of conductive traces 1220, 1130, 1140 may be covered or encapsulated. In some embodiments, a layer of material, for example insulating material, may be formed over all or portions of conductive traces 1220, 1130, 1140. Such a material may include, e.g., a sheet of material such as used for substrate 1210, a printed layer, for example using screen, ink jet, stencil or other printing means, a laminated layer, or the like. Such a printed layer may include, for example, an ink, a plastic and oxide, or the like. The covering material and/or the technique by which it is applied is not a limitation of the present invention.

Figure 13:
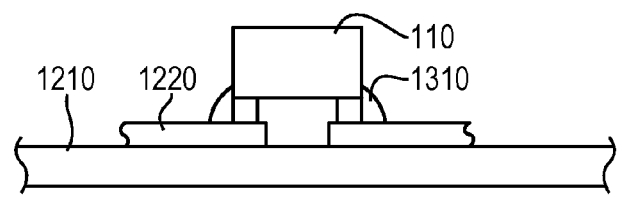
FIG. 13 is a schematic cross-section of a die attached to a substrate in accordance with various embodiments of the invention.

In one embodiment, the conductive traces 1220 are formed with a gap between adjacent conductive traces, and LEEs 110 and CCEs 270 are electrically coupled to conductive traces 1220 using conductive adhesive, e.g., an isotropically conductive adhesive and/or an anisotropic conductive adhesive (ACA). FIG. 13 shows one example of an LEE 110 electrically coupled to conductive traces 1210 using an ACA 1310. ACAs may be utilized with or without stud bumps and embodiments of the present invention are not limited by the particular mode of operation of the ACA. For example, the ACA may be pressure-activated or utilize a magnetic field rather than pressure (e.g., the ZTACH ACA available from SunRay Scientific of Mt. Laurel, N.J., for which a magnetic field is applied during curing in order to align magnetic conductive particles to form electrically conductive "columns" in the desired conduction direction). Furthermore, various embodiments utilize one or more other electrically conductive adhesives, e.g., isotropically conductive adhesives, non-conductive adhesives, in addition to or instead of one or more ACAs. In other embodiments, LEEs 110 and CCEs 270 may be attached to and/or electrically coupled to conductive traces 1220 by other means, for example solder, reflow solder, wave solder, wire bonding, or the like. The technique by which LEEs 110 and CCEs 270 are attached to conductive traces 1220 is not a limitation of the present invention.

In some embodiments, each LEE 110 includes or consists essentially of a bare semiconductor die (e.g., a bare-die LEE is an unpackaged semiconductor die), while in other embodiments LEE 110 includes or consist essentially of a packaged LED. In some embodiments, LEE 110 includes or consists essentially of a packaged surface-mount-device-type LED. In some embodiments, an LEE may include or consist essentially of a LED and a light-conversion material such as a phosphor. In some embodiments, an LEE may include or consist essentially of a LED and a light-conversion material, the combination of which produce substantially white light. In some embodiments, the white light may have a correlated color temperature (CCT) in the range of about 2000 K to about 10,000 K.

In some embodiments, LEE 110 may include or consist essentially of an LED. In some embodiments, LEE 110 may emit electromagnetic radiation within a wavelength regime of interest, for example, infrared, visible, for example blue, red, green, yellow, etc. light or radiation in the UV regime, when activated by passing a current through the device. In some embodiments, LEE 110 may include or consist essentially of a substrate over which the active device layers are formed. The structure and composition of such layers are well known to those skilled in the art. In general, such a layer structure (e.g., for an LED) may include top and bottom cladding layers, one doped n-type and one doped p-type, and one or more active layers (from which most or all of the light is emitted) in between the cladding layers. In some embodiments, the layers collectively may have a thickness in the range of about 0.25 µm to about 10 µm. In some embodiments, the substrate is transparent and all or a portion thereof is left attached to the device layers, while in other embodiments the substrate may be partially or completely removed. In some embodiments LEE 110 may include or consist essentially of a nitride-based semiconductors (for example containing one more of the elements Al, Ga, In, and nitrogen). In some embodiments, LEE 110 may include or consist essentially of a nitride-based semiconductors (for example containing one more of the elements Al, Ga, In, and nitrogen) and may emit light in the wavelength range of about 400 nm to about 500 nm.

In some embodiments, LEE 110 may be at least partially covered by wavelength-conversion material (also referred to herein as a phosphor), PCE, WCE or phosphor element (PE), all of which are utilized synonymously herein unless otherwise indicated. In some embodiments, white light may also be produced by combining the short-wavelength radiant flux (e.g., blue light) emitted by the semiconductor LED with long-wavelength radiant flux (e.g., yellow light) emitted by, for example one or more phosphors within the light-conversion material. The chromaticity (or color), color temperature, and color-rendering index are determined by the relative intensities of the component colors. For example, the light color may be adjusted from "warm white" with a correlated color temperature (CCT) of 2700 Kelvin or lower to "cool white" with a CCT of 10,000 Kelvin or greater by varying the type or amount of phosphor material. White light may also be generated solely or substantially only by the light emitted by the one or more phosphor particles within the light-conversion material. In some embodiments, the structure including or consisting essentially of LEE 110 and a light-conversion material may be referred to as a "white die." In some embodiments, white dies may be formed by forming a light-conversion material over and/or around one or more LEEs 110 and then separating this structure into individual white dies as described in the '864 application. However, this is not a limitation of the present invention, and in other embodiments a light-conversion material may be integrated with an LEE using a variety of different techniques.

While the discussion to this point has been in reference to light-emitting systems, this is not a limitation of the present invention and in other embodiments the adaptive power supply may be utilized with any system including or consisting essentially of an I-V curve having a signature on which a relatively optimal operating point may be identified. For example adaptive power supplies may be used in conjunction with a variety of systems and loads, including but not limited to computers, printers, displays, televisions, audio equipment, scanners, radios, commercial electronics, and the like.

While the discussion to this point has been in reference to AC powered systems, for example the power supply topology shown in FIG. 6A, this is not a limitation of the present invention, and in other embodiments the adaptive power supply may be DC powered, for example by a battery or other DC power source. For example adaptive power supplies using DC or battery power may be used in conjunction with a variety of systems and loads, including but not limited to computers, printers, displays, televisions, audio equipment, scanners, radios, mobile phones, laptop computers, tablets, walkie-talkies, flashlights, portable radios, personal music devices, personal video devices, portable commercial and personal electronics, and the like.

It is to be understood that the features of the various embodiments described herein are not mutually exclusive and can exist in various combinations and permutations. As used herein, the terms "substantially" and "approximately" mean ±10%, and in some embodiments, ±5%. As used herein, the term "phosphor" refers to any material that shifts the wavelength of light striking it and/or that is luminescent, fluorescent, and/or phosphorescent.

The terms and expressions employed herein are used as terms and expressions of description and not of limitation, and there is no intention, in the use of such terms and expressions, of excluding any equivalents of the features shown and described or portions thereof. In addition, having described certain embodiments of the invention, it will be apparent to those of ordinary skill in the art that other embodiments incorporating the concepts disclosed herein may be used without departing from the spirit and scope of the invention. Accordingly, the described embodiments are to be considered in all respects as only illustrative and not restrictive.

What is claimed is:

1. A method for controlling, via application of first and second voltages, a circuit incorporating a load (i) having a non-linear current-voltage relationship and (ii) comprising one or more light-emitting elements, the method comprising:
   (A) applying the first voltage to the load;
   (B) measuring a first current resulting from the first voltage applied to the load;
   (C) applying the second voltage to the load;
   (D) measuring a second current resulting from the second voltage applied to the load, a current difference between the second current and the first current having a magnitude and a polarity;
   (E) if the magnitude of the current difference is greater than a pre-determined value and the polarity of the current difference is positive, (i) setting the first voltage equal to the second voltage and (ii) increasing the second voltage by a voltage increment;
   (F) if the magnitude of the current difference is smaller than the pre-determined value and the polarity of the current difference is negative, (i) setting the first voltage equal to the second voltage and (ii) decreasing the second voltage by the voltage increment;
(G) if the magnitude of the current difference is greater than the pre-determined value and the polarity of the current difference is negative, (i) setting the first voltage equal to the second voltage and (ii) increasing the second voltage by the voltage increment;
(H) if the magnitude of the current difference is smaller than the pre-determined value and the polarity of the current difference is negative, (i) setting the first voltage equal to the second voltage and (ii) decreasing the second voltage by the voltage increment; and
(I) repeating steps (A)-(H) during operation of the circuit to regulate operation of the load notwithstanding any changes in the non-linear current-voltage relationship of the one or more light-emitting elements of the load during operation.

2. The method of claim 1, wherein the voltage increment decreases as a number of times steps (A)-(H) are repeated increases.

3. The method of claim 1, wherein the non-linear current-voltage characteristic of the load comprises a knee therewithin.

4. The method of claim 1, wherein (i) the magnitude of the current difference is greater than the pre-determined value and (ii) the second voltage is increased above a maximum operating voltage, further comprising decreasing the second voltage to the maximum operating voltage or less prior to applying the second voltage to the load.

5. The method of claim 4, wherein the maximum operating voltage is approximately 60 V.

6. The method of claim 1, wherein the load comprises a light-emitting array comprising:
first and second spaced-apart power conductors;
a plurality of light-emitting strings, each light-emitting string (i) comprising a plurality of interconnected light-emitting diodes spaced along the light-emitting string, (ii) having a first end electrically coupled to the first power conductor, (iii) having a second end electrically coupled to the second power conductor, wherein the power conductors supply power to each of the light-emitting strings; and
a plurality of control elements each (i) electrically connected to at least one light-emitting string and (ii) configured to utilize power supplied from the power conductors to control the current to the at least one light-emitting string to which it is electrically connected.

7. The method of claim 6, wherein the light-emitting diodes emit substantially white light.

8. The method of claim 1, further comprising pausing for a pre-determined amount of time prior to applying the second voltage to the load.

9. The method of claim 8, wherein the pre-determined amount of time is selected from the range of approximately 10 milliseconds to approximately 3600 seconds.

10. The method of claim 8, wherein the pre-determined amount of time increases as a number of times steps (A)-(H) are repeated increases.

11. The method of claim 1, wherein, after a plurality of repetitions of steps (A)-(H), the circuit operates at a stable operating range of voltages for at least a second plurality of repetitions of steps (A)-(H).

12. The method of claim 11, further comprising pausing for a pre-determined amount of time prior to applying the second voltage to the load, the pre-determined amount of time increasing at least once while the circuit operates at the stable operating range.

13. The method of claim 12, further comprising resetting the pre-determined amount of time to a default value if circuit operation diverges from the stable operating range.

14. The method of claim 11, further comprising decreasing the voltage increment at least once while the circuit operates at the stable operating range.

15. The method of claim 14, wherein, after the voltage increment has been decreased, maintaining the voltage increment at a substantially constant value notwithstanding continued circuit operation at the stable operating range.

16. The method of claim 14, further comprising resetting the voltage increment to a default value if the circuit operation diverges from the stable operating range.

* * * * *